US008589135B2

(12) United States Patent
Middya et al.

(10) Patent No.: US 8,589,135 B2
(45) Date of Patent: Nov. 19, 2013

(54) SYSTEMS, COMPUTER IMPLEMENTED METHODS, AND COMPUTER READABLE PROGRAM PRODUCTS TO COMPUTE APPROXIMATE WELL DRAINAGE PRESSURE FOR A RESERVOIR SIMULATOR

(75) Inventors: Usuf Middya, Dhahran (SA); Ali Haydar Dogru, Dhahran (SA)

(73) Assignee: Saudi Arabian Oil Company (SA)

( * ) Notice: Subject to any disclaimer, the term of this patent is extended or adjusted under 35 U.S.C. 154(b) by 855 days.

(21) Appl. No.: 12/774,820

(22) Filed: May 6, 2010

(65) Prior Publication Data

US 2010/0286971 A1    Nov. 11, 2010

Related U.S. Application Data

(60) Provisional application No. 61/176,261, filed on May 7, 2009.

(51) Int. Cl.
*G06G 7/58*    (2006.01)
*E21B 49/00*    (2006.01)

(52) U.S. Cl.
CPC ..................................... *E21B 49/00* (2013.01)
USPC ................................................ 703/10; 702/6

(58) Field of Classification Search
USPC ............................................... 703/10; 702/6
See application file for complete search history.

(56) References Cited

U.S. PATENT DOCUMENTS 7,584,086 B2 * 9/2009 Frankel ........................... 703/10
2009/0164189 A1 * 6/2009 Bourbiaux ...................... 703/10
2009/0248374 A1 * 10/2009 Huang et al. ..................... 703/2

OTHER PUBLICATIONS

Wells et al. "Average reservoir Pressure From a Horizontal Well Pressure Buildup Test"., International Petroleum Technology Conference., 2005., 6 Pages.*
U. Middya; "Computation of Average Well Drainage Pressure for a Parallel Reservoir Simulator," Presentation at 2006 SPE International Saudia Arabia Section Technical Symposium, in Alkhobar, Saudi Arabia, May 10-12, 2008.

* cited by examiner

*Primary Examiner* — Eunhee Kim
(74) *Attorney, Agent, or Firm* — Bracewell & Giuliani LLP

(57) ABSTRACT

Systems, computer implemented methods, and program products to determine approximate static well pressures for one or more arbitrary shaped wells by estimating the drainage volume of the one or more wells, are provided. The drainage volume of the one or more wells, for example, can be estimated from the one or more computed fluid flow flux vectors, and the approximate static well pressures for the one or more wells can be subsequently calculated by taking the pore volume average of the dynamic grid block pressures within the drainage volume of the one or more wells. The one or more fluid flow flux vectors can be calculated at each iteration in a numerical reservoir simulator as a part of standard simulator computations, negating a need for additional, extraneous computations to calculate effective drainage volume of the one or more wells.

70 Claims, 17 Drawing Sheets

| LENGTH | 11km |
| WIDTH | 11km |
| THICKNESS | 100 ft |
| PERMEABILITIES(X,Y,Z) | 500 mDarcy |
| POROSITY | 0.3 |
| WELL RATE | 10000 bbl oil/day |
| CONNATE WATER SAT | 0.12 |

SYSTEMS, COMPUTER IMPLEMENTED METHODS, AND COMPUTER READABLE PROGRAM PRODUCTS TO COMPUTE APPROXIMATE WELL DRAINAGE PRESSURE FOR A RESERVOIR SIMULATOR

RELATED APPLICATIONS

This application is a non-provisional of and claims priority to U.S. Provisional Patent Application No. 61/176,261, filed May 7, 2009, titled "Systems, Computer Implemented Methods, and Computer Readable Program Products To Compute Approximate Well Drainage Pressure For A Reservoir Simulator," incorporated by reference in its entirety.

BACKGROUND OF THE INVENTION

1. Field of the Invention

The present invention relates generally to the field of petroleum reservoir simulation history matching. More specifically, the present invention relates to the field of computing approximate static well pressures for one or more arbitrary shaped wells in both homogeneous and heterogeneous reservoirs.

2. Description of Related Art

Major oil companies, independent oil companies, small oil companies, and oil reservoir management consultants use reservoir simulators routinely in reservoir management. More specifically, oil field reservoir simulators are often used by oil industry professionals and oil companies to design new oil fields, determine efficient and productive drilling schedules, select optimum well locations, estimate surface facility timings, and design recovery methods. History matching is a key phase in a reservoir simulator as it serves to justify the model generated by a particular reservoir simulator as a predictive tool by matching key reservoir simulation variables to corresponding measured oil field data. In history matching, several key variables can be matched to measured quantities from field data to verify a particular simulator model as a predictive tool such as water cuts, gas oil ratios, and static well pressure.

Static well pressure, for example, is a particularly useful variable to verify a reservoir simulator model as a predictive tool, and accordingly, static well pressure receives prime attention during a history match. Specifically, the pressure variable is not only an indicator of reservoir energy, it is also indicative of a variety of other factors affecting the reservoir performance. Accordingly, many reservoir simulators are matched for static well pressures first before matching the other variables.

During a history match, for example, simulator computed well pressures can be matched against the measured static well pressures from measured field data. The measured static well pressures are generally obtained from pressure build-up tests and stored in corporate databases as field data. These pressure build-up tests are conducted at certain intervals during the life of the well. Ideally, a reservoir simulator can be used, for example, to simulate a pressure build-up test to thereby compute static well pressures at each simulated time interval that can be history matched to measured well pressures at each corresponding time interval to verify the integrity of the reservoir simulator as a predictive tool. The timing and number of such build-up tests, however, generally does not match the number of simulated static well pressures because the reservoir simulator calculates a static well pressure at each simulated time step or iteration, to an extent that the reservoir time steps vastly outnumber the number of actual build-up tests. As such, a one-to-one ratio in the time domain is unlikely when measured well data is history matched with reservoir simulator data.

As noted above, pressure build-up tests can be used to compute the static well pressure for a particular well, and for each pressure build-up test, the static well pressure can be measured and recorded in a field data database. These pressure build-up tests, however, may only be conducted once each month, and as such, only one static well pressure reading for each month will be available in the recorded field data for history matching. Conversely, a reservoir simulator can generate, for example, a static well pressure at each iteration or step, and such steps can vastly outnumber the number of observed, measured static well pressures of a particular well. Therefore, the time steps or iterations of a particular reservoir simulator is generally adjusted and reduced significantly to better approximate the actual frequency of build-up tests conducted during the history of a particular reservoir.

In practice, reservoir simulators use pore volume averaged grid block pressures over the grid blocks in which the well is perforated (i.e., perforated cells) to approximate static pressure. While this approximation may be somewhat reasonable for very large grid blocks, the inventors have recognized, however, that it is not a good approximation for smaller grid blocks when locally refined grids around the well are used, as the error becomes significant and must be corrected. Various correction factors are known in the art to correct static pressure estimated using pore volume averaged grid block pressures for perforated cells to match measured pressure build-up test driven static well pressures. These correction factors, however, are developed principally for vertical wells, and accordingly, fail to function appropriately when applied to multi-lateral wells, maximum reservoir contact welts, and many newer types of wells with complex shapes. Nonetheless, particularly in scenarios where correction factors fail to function appropriately, such as with wells of complex shapes, interpolation techniques can be used to accommodate the difference in build-up test times and simulator time steps. The use of interpolation techniques, however, results in an inefficient use of computer processing resources and can result in or otherwise require wrongfully introducing permeability modifiers to match the pressures when no real need exists for any modification of the reservoir properties.

SUMMARY OF THE INVENTION

In view of the foregoing, the inventors have recognized a need for a more accurately computed simulated static well pressure in order to more accurately verify a particular reservoir simulator as a predictive tool. Accordingly, various embodiments of the present invention provide systems, program product, and methods for determining static well pressure through simulation without the need for the identified inefficiencies and extensive processing requirements of conventional systems or the requirement to conduct build-up tests to determine, for example, unrealistic permeability modifiers or other unrealistic correction factors.

As introduced above, many industrial simulators currently generate a pore-volume average well pressure over the grid blocks in which a particular well is perforated (i.e., perforated grid blocks or cells). Unfortunately, this particular approach only potentially produces accurate approximations of static well pressures for simulations where very large well grid blocks or cells are used. In cases where small grid block around a particular well are used in a particular simulation, the conventional method yields relatively low static well pressures for producers and relatively high pressures for injectors, as compared to static well pressures obtained from build-up tests conducted for a particular reservoir. Although it is possible to introduce permeability modifiers to correct the noticeable inaccuracies when history matching measured static well pressures (e.g., stored as field data in a database) to corresponding simulated static well pressures, the inventors have recognized that there is no need to modify the reservoir properties in the majority of cases. That is, various embodiments of the present invention beneficially eliminate the need to use unrealistic permeability modifiers to correct the noticeable inaccuracies in static well pressure which ultimately result in an unrealistic static well pressure history match.

Advantageously, various embodiments of the present invention present new and practical systems, computer implemented methods, and computer readable program products to compute approximate static well pressures for an arbitrary shaped well through use of drainage volume averaged grid block pressures within a drainage volume of the arbitrary shaped well calculated from flux maps of reservoir fluid flux vectors computed by a fully implicit parallel reservoir simulator, for example, during every Newton iteration of the fully implicit reservoir simulator. Various embodiments of the present invention thereby compute an accurate approximation of the true static well pressures at every time step of the simulator. Accordingly, various embodiments of the present invention eliminate the need to simulate the pressure build-up test or to use correction factors to correct simulated dynamic grid block pressures to match measured pressure build-up test driven static well pressures.

According to various exemplary embodiments of the present invention, the drainage volume of the one or more wells can be estimated from the one or more computed fluid flux vectors, and the approximate static well pressures for the one or more wells can be subsequently calculated by taking the pore volume average of the dynamic grid block pressures within the drainage volume of the one or more wells. Beneficially, the one or more fluid flux vectors can be computed at each iteration in a numerical reservoir simulator as a part of standard simulator computations, and therefore, no additional, extraneous computations are needed to calculate effective drainage volume of the one or more wells. Particularly, various embodiments of the present invention, for example, can track the computed flux vectors and can determine the approximate size of the well drainage volume. The dynamically computed grid block pressures within the drainage volume can be, for example, subsequently pore volume averaged to estimate the static well pressure. Advantageously, exemplary embodiments of the present invention work well with existing oil field simulations and can be applied to any particular well shape to compute accurate approximate static well pressures while preventing introduction of unrealistic permeability modifications that distort the accuracy of history matching which ultimately result in an inaccurate indicator of the usefulness of a particular reservoir simulator as a predictive tool.

More specifically, various embodiments of the present invention can include a system to determine static well pressures for one or more arbitrary shaped wells in both homogeneous and heterogeneous reservoirs. According to an example of the embodiment of the system, such system can include a reservoir simulator computer having a plurality of processors, an input device, an output device, a memory containing a first, second, third, fourth, and fifth databases. The system can also include a fluid flux program product to determine fluid flow flux, a drainage boundary program product to determine three-dimensional boundaries of the effective drainage volume for each of the one or more wells, and a static well pressure program product to determine the static well pressure of each of one or more wells in the reservoir.

The fluid flux program product can include instructions that when executed by the reservoir simulator computer, cause the reservoir simulator computer to perform the operations of computing a plurality of fluid flow flux vectors at each of a corresponding plurality of interfaces with a plurality of neighboring grid blocks for each of a plurality of grid blocks contained within an effective drainage volume of each of one or more wells at each Newton iteration of a finite difference grid centered reservoir simulator, and storing the plurality of fluid flow flux vectors in the first database.

The drainage boundary program product can include instructions that when executed by the reservoir simulator computer cause the reservoir simulator computer to perform various operations for each of one or more drainage planes of a respective one or more well segments each oriented perpendicular to a direction of the one or more well segments of the respective one or more wells and including a face of a perforated grid block and a face of each of a plurality of grid blocks adjacent thereto. The operations can include, for example, performing the following on each of the plurality of grid blocks located along each separate one of a plurality of directions defining a plurality of pathways extending outward from the respective perforated grid block on the respective drainage plane: tracking a sign of each of the plurality of computed fluid flow flux vectors for each of the plurality of grid blocks located along the respective pathway extending from the respective perforated grid block on the respective drainage plane, comparing a magnitude of a phase flux for each of the plurality of grid blocks located along the respective pathway extending from the respective perforated grid block on the respective drainage plane with a magnitude of a corresponding phase flux at the perforated grid block for the respective drainage plane, and determining a distance of each of the plurality of grid blocks located along the respective pathway extending from the respective perforated grid block on the respective drainage plane.

The operations can also include determining a location of each separate drainage boundary along each corresponding separate one of the plurality of pathways extending from the respective perforated grid block on the respective drainage plane for each of the one or more well segments for each of the one or more wells to thereby estimate the effective drainage volume of each of the one or more wells, and storing the determined drainage boundary in the second database. The location of each drainage boundary of each separate drainage plane is determined, according to an embodiment of the invention, to be at the one of the following locations having a lesser distance from the perforated grid block of the well being analyzed, than each other of the following locations: the location of the grid block along the pathway being traversed where a change in the sign of the associated fluid flux vector for the grid block is first encountered when traversing the pathway from the perforated grid block on the respective drainage plane, the location of the grid block along the pathway being traversed where a phase flux ratio of the magnitude of the phase flux (along two perpendicular axes) to the magnitude of the corresponding phase flux at the perforated grid block is first encountered to be at a value below a pre-defined ratio limit when traversing the respective pathway from the perforated grid block on the respective drainage plane, and a location of one of the plurality of grid blocks along the respective pathway from the respective perforated grid block on the respective drainage plane where a distance of the respective one of the plurality of grid blocks from the respective perforated grid block is first encountered to have a value that meets or exceeds a pre-defined distance limit when traversing the respective pathway from the respective perforated grid block on the respective drainage plane.

The static well pressure program product can include instructions that when executed by the reservoir simulator computer cause the reservoir simulator computer to perform the operations of determining an estimate of the effective drainage volume of each of the one or more wells responsive to the respective determined drainage boundaries of each of the one or more drainage planes associated with the respective one or more wells, storing the estimate of the effective drainage volume of each of the one or more wells in the third database, determining a dynamic grid block pressure of the each of a plurality of grid blocks contained within the respective effective drainage volume of each of the one or more wells, storing the dynamic grid block pressures in the fourth database, determining a pore volume average of the dynamic grid block pressure of at least a substantial subset of the plurality of grid blocks contained within each respective effective drainage volume of each respective well to thereby define an estimated static well pressure for each of the one or more wells, and storing the static well pressure for each separate one of the one or more wells in the fifth database.

Various embodiments of the present invention can include reservoir modeling program product to determine static well pressures for one or more arbitrary shaped wells in both homogeneous and heterogeneous reservoirs provided as part of the above described system or as a stand-alone product stored on the tangible computer readable medium provided as a separate deliverable. According to an embodiment of the present invention, the reservoir modeling program product can include a set of instructions, stored on a tangible computer readable medium, that when executed by a computer, cause the computer to perform the operations of computing a plurality of fluid flow flux vectors at each of a corresponding plurality of interfaces with a plurality of neighboring grid blocks for each of a plurality of grid blocks contained within an effective drainage volume of a well, and selecting one or more drainage planes of a corresponding one or more well segments of the well each being oriented perpendicular to a direction of the corresponding one or more well segments of the well and including a face of a perforated grid block and a face of each of a plurality of grid blocks adjacent thereto.

The operations can also include performing the following on each of the plurality of grid blocks located along each separate one of a plurality of directions defining a plurality of pathways extending outward from the respective perforated grid block on the respective one of the one or more drainage planes: tracking a sign of each of the plurality of computed fluid flow flux vectors for each of the plurality of grid blocks located along the respective pathway extending from the respective perforated grid block on the respective drainage plane, comparing a magnitude of a phase flux for each of the plurality of grid blocks located along the respective pathway extending from the respective perforated grid block on the respective drainage plane with a magnitude of a corresponding phase flux at the perforated grid block for the respective drainage plane, and determining a distance of each of the plurality of grid blocks located along the respective pathway extending from the respective perforated grid block on the respective drainage plane.

The operations can also include determining a location of each separate drainage boundary along each corresponding separate one of the plurality of pathways extending from the respective perforated grid block on the respective drainage plane for each of the one or more well segments of the well to thereby estimate the effective drainage volume of the well.

The location of each drainage boundary of each separate drainage plane is determined, according to an embodiment of the invention, to be at the one of the following locations having a lesser distance from the perforated grid block of the well being analyzed, than each other of the following locations: the location of the grid block along the pathway being traversed where a change in the sign of the associated fluid flux vector for the grid block is first encountered when traversing the pathway from the perforated grid block on the respective drainage plane, the location of the grid block along the pathway being traversed where a phase flux ratio of the magnitude of the phase flux (along two perpendicular axes) to the magnitude of the corresponding phase flux at the perforated grid block is first encountered to be at a value below a pre-defined ratio limit when traversing the respective pathway from the perforated grid block on the respective drainage plane, and a location of one of the plurality of grid blocks along the respective pathway from the respective perforated grid block on the respective drainage plane where a distance of the respective one of the plurality of grid blocks from the respective perforated grid block is first encountered to have a value that meets or exceeds a pre-defined distance limit when traversing the respective pathway from the respective perforated grid block on the respective drainage plane.

The operations can further include determining an estimate of the effective drainage volume of the well responsive to the determined drainage boundaries of at least one of the one or more drainage planes to thereby identify the grid blocks contained within the effective drainage volume, determining a dynamic grid block pressure of each of a plurality of the grid blocks contained within the effective drainage volume of the well, and determining a pore volume average of the dynamic grid block pressure of at least a substantial subset of the plurality of grid blocks contained within the effective drainage volume of the well to thereby define an estimated static well pressure for the well.

According to another embodiment of the present invention, the reservoir modeling program product can include the operations of determining a location of each separate drainage boundary along each corresponding separate one of a plurality of pathways extending from a perforated grid block on a drainage plane of a well segment of a well to thereby estimate an effective drainage volume of the well. For reservoir simulations where multiple wells compete for fluid production, this operation can include determining the location of the respective drainage boundary to be: a location of one of a plurality of grid blocks along the respective pathway from the perforated grid block where a change in a sign of an associated fluid flux vector for the one of the plurality of grid blocks from that of an adjacent prior traversed one of the plurality of grid blocks along the respective pathway is first encountered when traversing the respective pathway from the perforated grid block on the drainage plane. For reservoir simulations where multiple wells do not compete for fluid production such that a change in fluid flux is not anticipated to be first encountered, determining the location of the respective drainage boundary to be at a respective one of the following locations having a lesser distance from the perforated grid block than the other of the following locations: the location of one of the plurality of grid blocks positioned along the respective pathway from the perforated grid block where a phase flux ratio of a magnitude of a phase flux of the respective one of the plurality of grid blocks to a magnitude of the corresponding phase flux at the perforated grid block is first encountered to be at a value below a pre-defined ratio limit when traversing the respective pathway from the perforated grid block on the drainage plane, and the location of one of the plurality of grid blocks positioned along the respective pathway from the perforated grid block where a distance of the respective one of the plurality of grid blocks from the perforated grid block is first encountered to have a value that meets or exceeds a pre-defined distance limit when traversing the respective pathway from the perforated grid block on the drainage plane. Advantageously, the location data can be used for determining estimated static well pressure of the well. This can be accomplished by first determining a dynamic grid block pressure of each of a plurality of the grid blocks contained within the effective drainage volume of the well as identified above, and calculating a pore volume average of the dynamic grid block pressure of at least a substantial subset of the plurality of grid blocks contained within the effective drainage volume of the well to thereby define the estimated static well pressure for the well.

According to another embodiment of the present invention, the reservoir modeling program product can include the operations of determining a plurality of drainage boundaries of a drainage plane for a well segment of a well, determining an estimate of the effective drainage volume of the well responsive to the determined drainage boundaries of at least one of one or more drainage planes for the well, identifying each of the plurality of grid blocks contained within the drainage volume of the well, and determining a grid block pressure of the each of a plurality of grid blocks contained within the effective drainage volume of the well. The operations can also include determining a pore volume average of the grid block pressure of each of a plurality of grid blocks within the effective drainage volume of the well, for example, including at least about 80%-90% of the grid blocks within the effective drainage volume, but preferably all, or substantially all of the grid blocks within the drainage volume, and estimating static well pressure for the well from the pore volume average for the effective drainage volume.

According to an exemplary configuration, a model of the well includes a plurality of drainage planes. According to such configuration, the operation of determining a plurality of drainage boundaries of a drainage plane for a well segment is performed for each of the plurality of drainage planes, and the effective drainage volume of the well is estimated based on the determined drainage boundaries of two or more perpendicular drainage planes of the plurality of drainage planes. Additionally, according to an exemplary configuration, the operation of determining an estimate of the effective drainage volume is performed for a heterogeneous reservoir through application of a numerical solution.

Embodiments of the present invention can also include computer implemented methods to compute a plurality of approximate static well pressures for one or more arbitrary shaped wells, for example, by estimating the effective drainage volume of one or more wells from one or more computed flux vectors during each of a plurality of Newton iterations in a fully implicit reservoir simulator, and by computing the drainage volume averaged grid block pressures within the estimated drainage volume of the one or more wells to thereby define the estimated static well pressure for the one or more wells. Specifically, such a computer implemented method can include, for example, the steps of computing, via a first computer process, a plurality of fluid flux vectors at the interfaces of one or more grid blocks with a plurality of neighboring grid blocks at each Newton iteration of a finite difference grid centered reservoir simulator for one or more wells, and determining, via the first computer process, the direction of the flow of reservoir fluid to the one or more wells by analyzing the sign of the plurality of computed fluid flux vectors at each Newton iteration of the finite difference grid centered reservoir simulator for one or more wells. The computer implemented method according to an exemplary embodiment of the present invention can also include, for example, the steps of tracking the sign of the plurality of computed fluid flux vectors to determine the drainage boundary at each Newton iteration of the finite difference grid centered reservoir simulator for one or more wells, and determining the three-dimensional boundaries of the extent of the drainage boundary of the well drainage volume responsive thereto.

The step of tracking the sign of the plurality of computed fluid flux vectors to determine the three-dimensional boundaries of the extent of the drainage boundary of the well drainage volume can further include, for example, the step of selecting, via a second computer process, one or more drainage planes of one or more well segments that include the perforated grid block and are perpendicular to one or more of the one or more well segments. Further, for reservoir simulations where multiple wells compete for fluid production, the step of determining the three-dimensional boundaries of the extent of the drainage boundary of the well drainage volume can also include the step of determining, via the second computer process, for reservoir simulations where multiple wells compete for fluid production, the drainage boundary on each of the one or more drainage planes to be the position where the sign of the associated fluid flux vector changes. Conversely, for other reservoirs, the step of determining the three-dimensional boundaries of the extent of the drainage boundary of the well drainage volume can also include the step of determining, via the second computer process, for reservoir simulations where multiple wells do not compete for fluid production, the drainage boundary on each of the one or more drainage planes by comparing one or more fluid flux vectors on the drainage plane along two perpendicular axis of the drainage plan with the flux at the perforated grid block.

In addition, such a computer implemented method, according to an exemplary embodiment of the present invention, can further include, for example, the steps of computing, via a third computer process, an estimate of drainage volume of the one or more wells at each of the plurality of Newton iterations in the fully implicit reservoir simulator responsive to the computation of the plurality of fluid flux vectors and tracking, via the third computer process, the plurality of fluid flux vectors at each of the plurality of Newton iterations of the fully implicit reservoir simulator for each of the one or more wells to thereby determine the approximate size of the well drainage volume. The method can also include the steps of determining, via the third computer process, one or more dynamic grid block pressures within the drainage volume of each of the one or more wells at each of the plurality of Newton iterations of the fully implicit reservoir simulator, and computing, via the third computer process, a plurality of static well pressures for the one or more wells, for example, at each Newton iteration of the fully implicit reservoir simulator, by taking the pore volume average of the dynamic grid block pressures of the dynamic grid blocks within the drainage volume of the one or more wells.

According to another embodiment of the present invention, a computer implemented method to determine a plurality of approximate static well pressures for one or more arbitrary shaped wells in a reservoir, can include the steps of computing, for each of the plurality of grid blocks contained within an effective drainage volume of a well, a plurality of fluid flow flux vectors at each of a corresponding plurality of interfaces with a plurality of neighboring grid blocks, and selecting one or more drainage planes of a corresponding one or more well segments for the well. The method can also include determining a location of each separate drainage boundary along each corresponding separate one of the plurality of pathways extending from the respective perforated grid block on each of the one or more drainage planes to thereby estimate the effective drainage volume of each of the one or more wells.

For reservoir simulations where multiple wells compete for fluid production, the drainage boundary determination step can include determining the location of the respective drainage boundary to be a location of one of a plurality of grid blocks along the respective pathway from the respective perforated grid block on the respective drainage plane where a change in a sign of an associated fluid flux vector for the one of the plurality of grid blocks from that of an adjacent prior traversed one of the plurality of grid blocks along the respective pathway is first encountered when traversing the respective pathway from the respective perforated grid block on the respective drainage plane.

Additionally, for reservoir simulations where multiple wells do not compete for fluid production, the drainage boundary determination step can include determining the location of the respective drainage boundary to be at a respective one of the following locations having a lesser distance from the respective perforated grid block than the other of the following locations: the location of one of the plurality of grid blocks positioned along the respective pathway from the respective perforated grid block on the respective drainage plane where a phase flux ratio of a magnitude of a phase flux of the respective one of the plurality of grid blocks to a magnitude of the corresponding phase flux at the respective perforated grid block is first encountered to be at a value below a pre-defined ratio limit when traversing the respective pathway from the respective perforated grid block on the respective drainage plane, and the location of one of the plurality of grid blocks positioned along the respective pathway from the respective perforated grid block on the respective drainage plane where a distance of the respective one of the plurality of grid blocks from the respective perforated grid block is first encountered to have a value that meets or exceeds a pre-defined distance limit when traversing the respective pathway from the respective perforated grid block on the respective drainage plane. The method can also include the steps of determining an estimate of the effective drainage volume of the well responsive to the determined drainage boundaries of each of the one or more drainage planes to thereby identify the grid blocks contained within the effective drainage volume, determining a grid block pressure of each of a plurality of grid blocks contained within the effective drainage volume of the well, and determining a pore volume average of the dynamic grid block pressure of at least a substantial subset of the plurality of grid blocks contained within the effective drainage volume of the well to thereby define an estimated static well pressure for the well.

According to another embodiment of the present invention, a computer implemented method to determine a plurality of approximate static well pressures for one or more arbitrary shaped wells in a reservoir, can include the steps of determining a plurality of drainage boundaries of a drainage plane for a well segment of a well, determining an estimate of the effective drainage volume of the well responsive to the determined drainage boundaries of at least one of one or more drainage planes for the well, identifying each of the plurality of grid blocks contained within the drainage volume of the well, and determining a grid block pressure of the each of a plurality of grid blocks contained within the effective drainage volume of the well. The steps can also include determining a pore volume average of the grid block pressure of each of a plurality of grid blocks within the effective drainage volume of the well, for example, including at least about 80%-90% of the grid blocks within the effective drainage volume, but preferably all, or substantially all of the grid blocks within the drainage volume, and estimating static well pressure for the well from the pore volume average for the effective drainage volume.

BRIEF DESCRIPTION OF THE DRAWINGS

So that the manner in which the features and benefits of the invention, as well as others which will become apparent, may be understood in more detail, a more particular description of the embodiments of the invention may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

DETAILED DESCRIPTION

Figure 1:
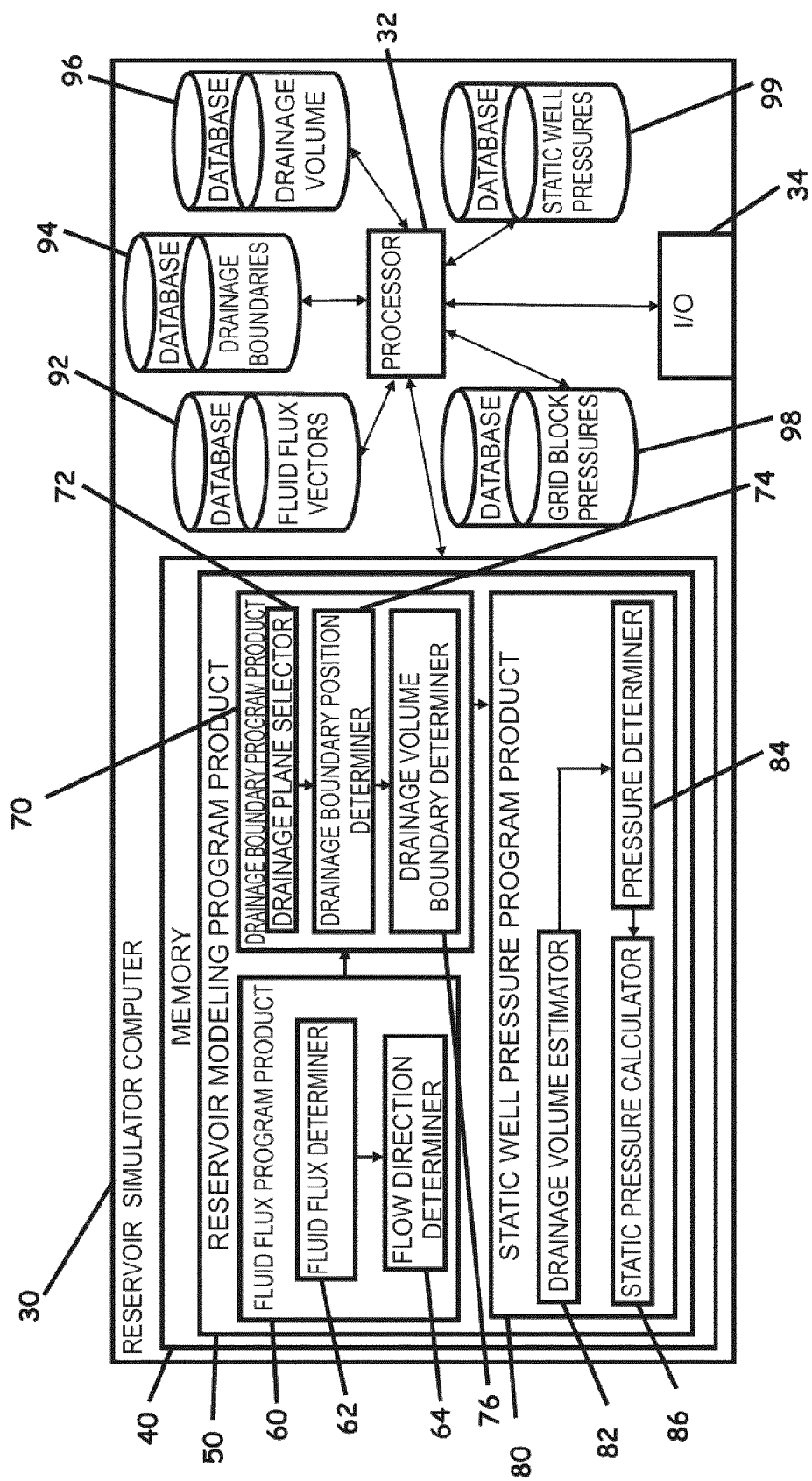
FIG. 1 is a schematic block diagram of a system to determine static well pressures for one or more arbitrary shaped wells in both homogeneous and heterogeneous reservoirs according to an exemplary embodiment of the present invention.

The present invention will now be described more fully hereinafter with reference to the accompanying drawings which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings. In the drawings and description that follows, like numbers refer to like elements throughout. Prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness.

Beneficially, embodiments of the present invention provide systems, computer implemented methods, and computer readable program products that can more accurately compute or estimate approximate static well pressures for an arbitrary shaped well or wells in both homogeneous and heterogeneous reservoirs than is provided according to conventional methods. To do so, various embodiments of the present invention include hardware, software, program products, and process steps for estimating the drainage volume of the arbitrary shaped well or wells. Correspondingly, various embodiments of the present invention also include hardware, software, program products, and process steps for estimating or otherwise determining the drainage volume of each well which can provide the modeling necessary to provide the accurate static well pressure for the respective well. According to one or more exemplary embodiments of the present invention, the drainage volume of each well can be determined, for example, through analysis of fluid flux vectors computed by a fully implicit reservoir simulator, e.g., during every Newton iteration of the fully implicit reservoir simulator. That is, various embodiments of the present invention can be employed to track the computed flux vectors and to determine the approximate size of the well drainage volume. The dynamically computed grid block pressures within the drainage volume can be, for example, subsequently determined and the pore volume averaged to estimate the static well pressure.

Beneficially, providing such accurate static well pressure through a numerical solution, according to one or more exemplary embodiments of the present invention, can resultingly eliminate the need to simulate the pressure build-up test by the simulator or the need to use correction factors to correct simulated dynamic grid block pressures to measured pressure build-up test driven static well pressures. Further, beneficially, various exemplary embodiments of the present invention work well with existing oil field simulations and can be applied to any particular well shape to compute accurate approximate static well pressures while preventing introduction of unrealistic permeability modifications that distort the accuracy of history matching thereby ultimately resulting in an inaccurate indicator of the usefulness of a particular reservoir simulator as a predictive tool.

According to an exemplary embodiment of the present invention, component fluxes can be computed, for example, during each reservoir simulator iteration during time step calculations in a fully implicit simulator. The time steps, time elements which make up total time, can vary from a fraction of a day to a month during the simulation. To further enhance accuracy, various embodiments of the present invention can compute the fluid flux vectors, drainage volume or volumes, and an accurate approximation of the true static well pressures at every time step, and/or Newton iteration, of the simulator. Phase fluxes for oil, water, and gas can also be computed, for example, during each reservoir simulator iteration.

According to various exemplary embodiments of the present invention, the component fluxes can be computed at the interfaces of any simulator grid block cell for the particular cell's six neighbors, e.g., for a finite difference grid centered simulator. In such cases, the sign of the calculated fluxes can represent the direction of the flow of oil in the well. As such, various embodiments of the present invention can readily track the sign of the flux to determine the extent of the drainage boundary at the end of a converged time step. In order to perform such tracking, the drainage plane of a particular well segment comprising the perforated cell can be selected as the plane perpendicular to the direction of a particular well segment. According to various exemplary embodiments of the present invention, the drainage boundary on the drainage plane is assumed to take place where the sign of the flux is changed. This particular assumption, for example, functions well in most commonly occurring situations where multiple producing wells compete for fluid production. Nevertheless, various embodiments of the present invention can switch to different stopping criteria when well spacing is much larger compared to the drainage radius. In such irregular cases, the phase fluxes on the drainage plane along the two perpendicular axes can be compared against the flux at a perforated grid block (cell). In such configuration, the computation stops when the ratio of the flux at the cell in question to that of the perforated cell falls below a pre-specified limit. Such computation can also stop if the distance between the cell and the perforated cell exceeds a pre-defined distance.

Various embodiments of the present invention can use the aforementioned steps to find the east and west boundaries of a perforated grid block in the YZ plane, the top and bottom boundaries in the XY plane, and the north and south boundaries in the ZX plane. Based on such a flux map, however, it is not always possible to obtain perfect straight line boundaries in the X, Y, and Z directions. Accordingly, in such cases, drainage boundaries can be approximated, according to exemplary embodiments of the present invention, by continuous straight lines, and the drainage volume can be simplified to a three-dimensional approximate drainage volume box as is perhaps best illustrated in FIG. 2.

More particularly, FIGS. 1-19 illustrated exemplary systems, program products, and methods to determine static well pressures for one or more arbitrary shaped wells in both homogeneous and heterogeneous reservoirs. As is perhaps best illustrated in FIG. 1, a system according to embodiments of the present invention, by way of example, can include a reservoir simulator computer 30 having at least one, the more typically a plurality of processors 32, an input device 34, an output device 34, and memory 40. The memory 40 can include volatile and nonvolatile memory known to those skilled in the art including, for example, RAM, ROM, and magnetic or optical disks, just to name a few. Note, it should also be understood that the exemplary computer configuration is given by way of example and that other types of computers configured according to various other methodologies known to those skilled in the art can be used. The computer 30 shown schematically in, for example, FIG. 1 represents a single computer, a server, or computer or server cluster or farm, to include shared-memory supercomputers (e.g. SGI Altix) and distributed-memory supercomputers (e.g. commodity PC cluster, massively parallel IBM Blue Gene). Further, the processor schematically shown in FIG. 1 represents, for example, a single processor, a single processor with multiple cores, multiple separately housed processors located within the same computer, and/or one or more of such processors distributed across multiple physically separate computers along with others known to those skilled in the art.

The system can also include a first 92, second 94, third 96, fourth 98, and fifth 99 databases stored in either internal or external memory, e.g., in a separate computer (not shown) such as a database management computer, assessable to the at least one processor 32. The first database 92, can include, for example, a plurality of fluid flux vectors, the second database 94 can include, for example, a plurality of drainage boundaries, the third database 96 can include, for example, a plurality of drainage volumes, the fourth database 98 can include, for example, a plurality of grid block pressures, and the fifth database 99 can include, for example, a plurality of computed static well pressures.

Such a system according to exemplary embodiments of the present invention can also include reservoir modeling program product 50 to determine static well pressures for one or more arbitrary shaped wells in both homogeneous and heterogeneous reservoirs. The reservoir modeling program product 50 can be in the form of microcode, programs, routines, and symbolic languages that provide a specific set for sets of ordered operations that control the functioning of the hardware and direct its operation, as known and understood by those skilled in the art. The reservoir modeling program product 50, according to an embodiment of the present invention, need not reside in its entirety in volatile memory, but can be selectively loaded, as necessary, according to various methodologies as known and understood by those skilled in the art. The reservoir modeling program product 50 can include a fluid flux program product 60, a drainage boundary program product 70, and a static well pressure program product 80, which can be in the form of modules of a single program product, modules of one or more separate program products, individual standalone deliverables, or other configurations as understood by one of ordinary skill in the art.

Figure 2:
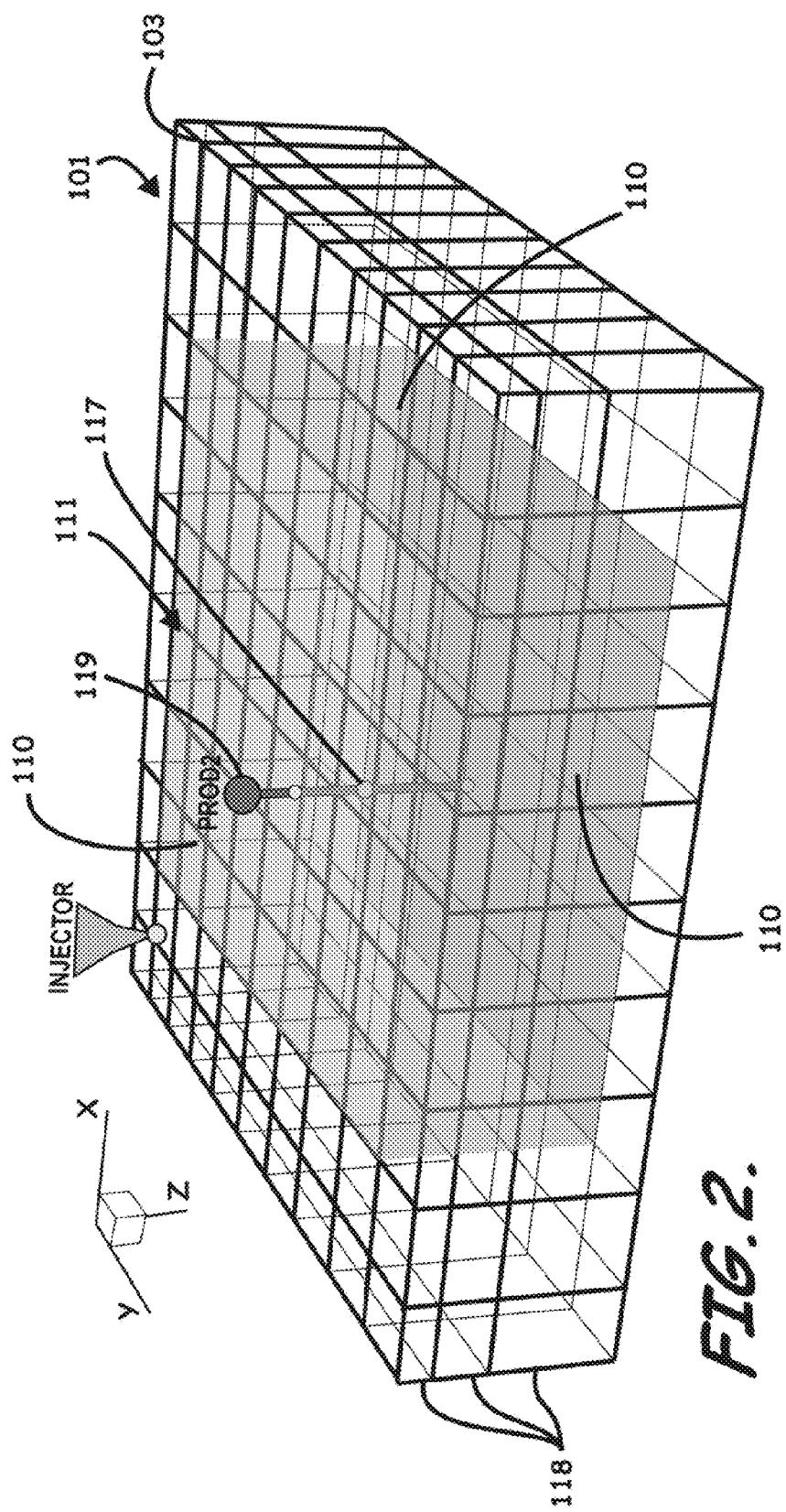
FIG. 2 is a three-dimensional graphical representation of an approximate drainage volume box within a reservoir for a single well case whereby the drainage boundaries are approximated by continuous straight lines and the drainage volume is simplified to a three-dimensional box according to an exemplary embodiment of the present invention.
Figure 3:
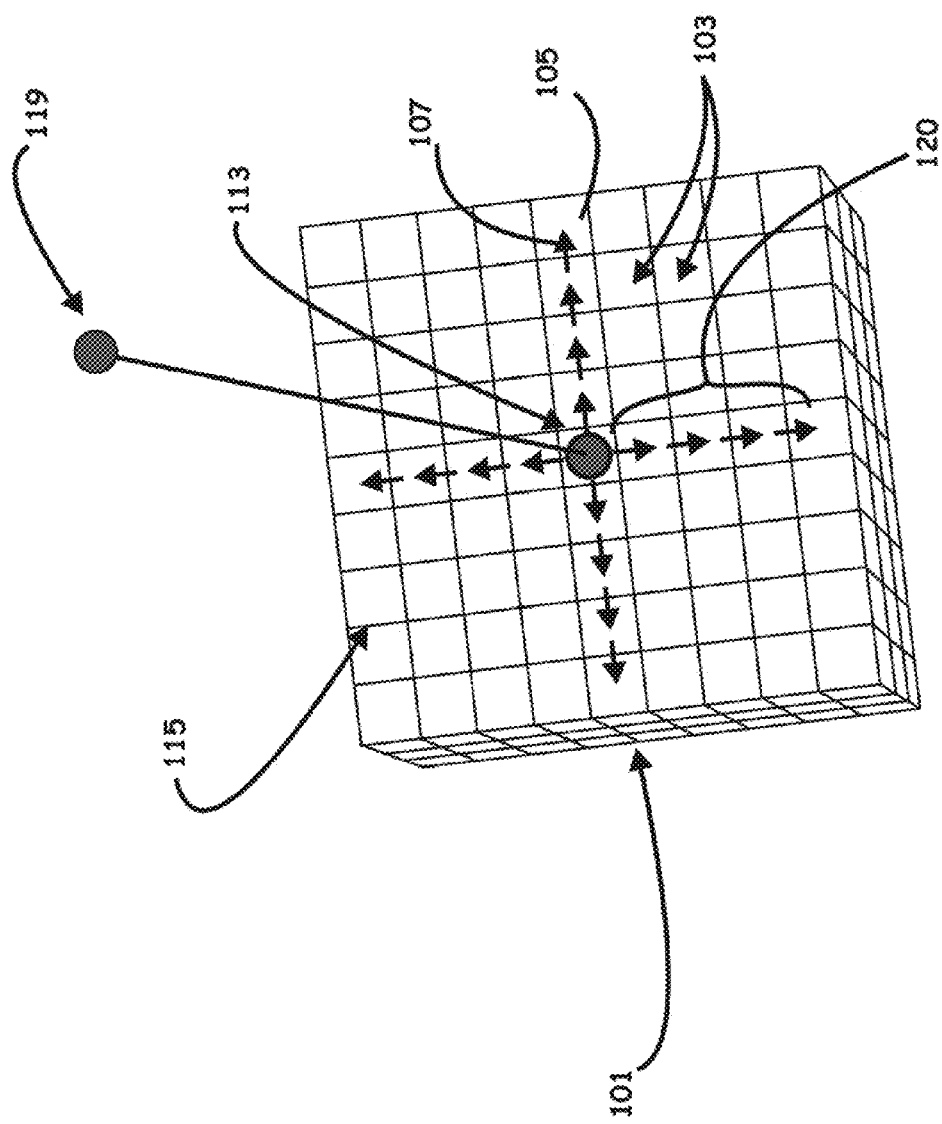
FIG. 3 is a graphical representation of a drainage plane in a finite difference grid block description of a reservoir according to embodiment of the present invention.

As understood by those of ordinary skill and the art, reservoir simulation models according to the exemplary embodiments of the present invention can be formed by dividing the reservoir 101 into "finite difference grid blocks." As perhaps best shown in FIGS. 2 and 3, each grid block 103 can resemble a "brick" in a building. These blocks or bricks 103 are generally referred to as computational elements. For each computational element, the reservoir simulator or simulation calculates a single value of a reservoir variable such as, for example, "pressure" or "amount of oil-oil saturation," etc. Various input variables used for performing the various calculations can include Permeability, Porosity, length of the grid block in three dimensions (which can be considered like a rectangular prism or a match box), Oil Saturation, Water Saturation, Gas Saturation, Capillary Pressure, Relative Permeability, and fluid properties like Viscosity and Density of the fluids inside the grid block (a grid block represents a sponge type rock which contains oil, water and gas). Regardless, for simplicity, according to a preferred configuration, variables such as grid block pressure for each separate grid block 103 is assumed to be constant within that grid block (brick). For example, if a grid block 103 were assigned or otherwise determine to have a pressure value of 2500 psi, this value would generally assumed to be assigned to the center point of the grid block and hence would not change from one point to another within the same grid block.

According to an exemplary embodiment of the system as perhaps best illustrated in FIG. 1, the fluid flux program product 60 can, for example, include instructions that when executed by the reservoir simulator computer 30 cause the reservoir simulator computer 30 to perform the operations of computing a plurality of fluid flux vectors at the interfaces of one or more grid blocks 103 with a plurality of neighboring grid blocks 103 at each Newton iteration of a finite difference grid centered reservoir simulator for one or more wells 119, performed, for example, by a fluid flux determiner 62, storing the plurality of fluid flux vectors in the first database 92, and determining the direction of the flow of oil in the one or more wells 119 by analyzing the sign of the plurality of computed fluid flux vectors 107 at each Newton iteration of the finite difference grid centered reservoir simulator for one or more wells 119, performed, for example, by a flow direction determiner 64 forming part of the fluid flux program product 60, the drainage boundary program product 70, and/or a separate program product within the reservoir modeling program product 50, for example.

More specifically, as perhaps best illustrated in FIG. 3, as a principal of operation according to an exemplary configuration, the fluid fluxes 107 across a particular face 105 of each grid block 103 are determined as vectors 107 normal (perpendicular) to a selected face 105 of the grid block 103. Fluid flux (q) which is the rate of fluid flow or flux (e.g., oil phase) between two neighboring grid blocks 103 across a particular face 105 can be given, for example, by the Darcy's equation as q=−(k A/Vis) Dp/Dx, whereby "k" is the permeability of the rock at the selected face of the respective grid block 103, "A" is the surface area of the same face of the grid block 103, and "Vis" is the oil viscosity, "Dp" is the pressure difference between the center of the grid block 103 and the center of a selected neighboring grid block 103, and "Dx" is the difference between the centers of the grid blocks. These fluxes 107 have directions (central grid block to, e.g., east neighbor, west neighbor, or north neighbor, etc). Since the fluxes 107 between each neighboring grid block 103 along the face 105 has both direction and magnitude, it is considered a vector quantity, and thus, it is interchangeably referred to as a "flux vector."

According to the exemplary embodiment of the system, the drainage boundary program product 70 and/or the fluid flux program product 60 can, for example, include instructions that when executed by the reservoir simulator computer 30 cause the reservoir simulator computer 30 to perform the operation of determining the 110 of a three-dimensional boundaries drainage volume box 111 (see FIG. 2) extending around one or more perforated grid blocks 113 and a plurality of neighboring grid blocks 103, by tracking the sign of the plurality of computed fluid flux vectors 107 along the drainage plane 115 of the particular well segment 117 contained within the respective perforated grid block 113 for each perforated grid block 113 associated with the respective well 119. According to an example configuration, the fluid flux vector and/or drainage boundary determinations can be made at each converged time step and/or each Newton iteration of the finite difference grid centered reservoir simulator for one or more wells.

As a principal of operation according to an exemplary configuration, the simulation divides the reservoir 101 into multiple areal planes to form layers 118 each having a number (Nx) of grid block 103 in the "x" direction and a number (Ny) of grid blocks 103 in "y" direction. Since reservoirs are three dimensional volumes, these areal planes are stacked together vertically to describe the reservoir in three dimensions. The number of layers 118 in the vertical direction is denoted by (Nz). Therefore, a reservoir simulator is composed of Nz areal planes each having Nx*Ny grid blocks 103. Hence, the total number of the grid blocks 103 in the reservoir simulator/ simulation according to the exemplary configuration is Nx*Ny*Nz. In a vertical well example, the vertical well axis extends through all the planes/layers 118 at the well location, and a perforation of the well 119 would be located in a grid block 103 in which the well axis extends through, located in one of the areal planes. When the well 119 produces from this perforation, it will primarily drain from this particular areal plane. Considering multiple perforations in a vertical well, each perforation will preferentially drain from the respective areal plane (e.g., face of the respective layer 118) of the reservoir 101 in which the respective perforation is located. The part of a well 119 that is contained within this areal plane is referred to as the "well segment" 117, the particular areal plane, itself, is referred to as the "drainage plane" 115 (see, e.g., FIG. 3), and the associated grid block 103 where the perforation is located is referred to as the perforated grid block 113.

More specifically, according to embodiment of the present invention, the drainage boundary program product 70 can include instructions that when executed by the reservoir simulator computer 30 cause the reservoir simulator computer 30 to perform the operations of selecting one or more drainage planes 115 of one or more well segments 117 that include a perforated grid block 113 and are perpendicular to one or more of the one or more well segments 117, performed, for example, by drainage plane selector 72, and determining the drainage boundary 112 of each of the one or more drainage planes 115, performed, for example, by drainage boundary position determiner 74, and three-dimensional boundaries of the drainage volume 111, for example, by drainage volume boundary determiner 76.

According to an exemplary configuration, the drainage boundary program product 70 can also include instructions that when executed by the reservoir simulator computer 30 cause the reservoir simulator computer 30 to perform the operations of determining, for reservoir simulations where multiple wells 119 compete for fluid production, the drainage boundary 112 on each of the one or more drainage planes 115 to be the position where the sign of the associated fluid flux vector 107 changes, and storing the determined drainage boundary 112 in the second database 94.

As a principal of operation according to an exemplary configuration, the reservoir simulator/simulation is composed of time steps (time intervals of a complete history or forecast). At each time step, the simulator/simulation solves non-linear equations describing the pressure and saturations for the entire reservoir. In doing so, the simulator/simulation determines the value of the pressure, oil saturation, water saturation and gas saturation for each grid block 103. As there are Nx*Ny*Nz grid blocks 103, in an example where there are 100*100*20 (i.e., 200,000) grid blocks, and it is assumed that each grid block 103 has four unknowns (e.g., pressure and three fluid saturations), the simulator/simulation must solve for 800,000 equations in 800,000 unknowns per time step. Further, as the relationship between the unknowns are non-linear, the equations are first linearized, for example, utilizing the Newton Raphson method, whereby between two and four iterations or normally performed for each time step. Beneficially, while forming these equations, the directions and magnitude of "flux vectors" are explicitly computed at every grid block 103. Such values can be tracked to provide a reference location for the boundaries 112 of each drainage plane 115, for example, at the end of a converged time step, and thus, the boundaries of the drainage volume "box" 111.

According to an exemplary configuration, the drainage boundary program product 70 can also include instructions that when executed by the reservoir simulator computer 30 cause the reservoir simulator computer 30 to further perform the operations of determining, for reservoir simulations where multiple wells 119 do not compete for fluid production, the drainage boundary 112 on each of the one or more drainage planes 115 by comparing phase fluxes on the drainage plane 115 along two perpendicular axis of the drainage plane 115 with the phase flux at the perforated grid block 113 until the ratio of the phase flux of the grid block 103 in question to that of the perforated grid block exceeds a pre-determined limit, and storing the determined drainage boundary 112 in the second database 94.

Since the sizes of the grid blocks 103 are known, one can easily calculate the distance between the perforation block 113 and each grid block 103. Accordingly, also or alternatively, the operation of determining the drainage boundary 112 on each of the one or more drainage planes 115 can be performed by comparing the distance of each successive grid block 103 from the perforated grid block 113 to a pre-defined distance until the distance of the grid block 103 in question from the perforated grid block 113 meets or exceeds the pre-defined distance. This procedure can be particularly useful to provide a default drainage boundary location in a particular direction or pathway to thereby define the boundary of the "drainage volume" in that direction when the process has traversed a sufficient number of grid blocks 103 without identifying a sign change and/or exceeding a phase flux ratio and the drainage boundary.

Regardless of the configuration of the reservoir or number of perforations in each well, once the above procedures are carried out for each perforation of each well 119, according to the exemplary configuration, the necessary data to compute the well drainage volume is complete.

The static well pressure program product 80, according to an exemplary embodiment of the present invention, can include instructions that when executed by the reservoir simulator computer 30 cause the reservoir simulator computer 30 to perform the operations of computing an estimate of drainage volume 111 of each of the one or more wells 119, for example, at the end of each converged time step and/or at each of the plurality of Newton iterations in the fully implicit reservoir simulator responsive to the computation of the boundaries 112 of each of the one or more drainage planes 115 to thereby determine the approximate size of the well drainage volume 111, and storing the one or more computed estimates of drainage volume 111 in the third database 96, performed, for example, by drainage volume estimator 82. As a principal of operation according to an exemplary configuration and based on the methodology mentioned above, an approximate drainage volume 111 can be computed by summing up the volume of every individual grid block 103 within the drainage volume 111. This calculation yields a drainage volume 111 which is very close the actual, but not exact because finite difference grid blocks are used. Finite difference grid blocks 103 can divide the reservoir into unequal rectangular prisms or match boxes (see, e.g., FIG. 4), where reservoir variables such pressures are assumed constant within each block 103. In actuality, drainage boundaries 110 can be complicated surfaces. These surfaces, however, can be approximated by planes in finite difference simulators/simulations. If it is desired that the finite difference solution to be very close to the actual solution, one can use very small sized grid blocks 103. The smaller size, however, will yield very large number of unknowns to solve and can be very expensive, resulting in a need to adjust for a trade-off between accuracy and efficiency. For example, by using smaller grids, the 200,000 block model can increase to 200 million blocks, a computationally expensive endeavor on a digital computer. Accordingly, when building the simulation models, engineers will use a sufficient number of grid blocks 103 such that computer solution for the drainage volume 111 is within the engineering accuracy, while accounting for limited computer resources. FIG. 2 shows such an approximate drainage volume or "box" 111 for a single well case.

The static well pressure program product 80 can further include instructions that when executed by the reservoir simulator computer 30 cause the reservoir simulator computer 30 to perform the operations of retrieving or otherwise determining the dynamic grid block pressures of each grid block 113 within the drainage volume 111 of each of the one or more wells 119, for example, at the end of each converged time step and/or at each of the plurality of Newton iterations of the fully implicit reservoir simulator, and storing the one or more dynamic grid block pressures in the fourth database 96, performed, for example, by pressure determiner 84. The static well pressure program product 80 can further include instructions that when executed by the reservoir simulator computer 30 cause the reservoir simulator computer 30 to perform the operations of computing a plurality of static well pressures for the one or more wells 119, for example, at the end of each converged time step and/or at each Newton iteration of the fully implicit reservoir simulator by taking the pore volume average of the dynamic grid block pressures of at least a substantial portion of the grid blocks 113 determined to be within the drainage volume 111 of the one or more wells 119, and storing the plurality of static well pressures in the fifth database 99, performed, for example, by static pressure calculator 86

Embodiments of the present invention also include, for example, a computer implemented method to compute a plurality of approximate static well pressures for one or more arbitrary shaped wells 119 in a reservoir 101. By way of example, and as perhaps best illustrated in FIG. 6, such a computer implemented method can include, for example, the steps of computing, via a first computer process, a plurality of fluid flux vectors at the interfaces of one or more grid blocks or cells 103 with a plurality of neighboring grid blocks, e.g., at each Newton iteration of a finite difference grid centered reservoir simulator for one or more wells 119 (block 121), and determining, via the first computer process, the direction of the flow of oil in the one or more wells 119 (see, e.g. FIGS. 13 and 15) by analyzing the sign of the plurality of computed fluid flux vectors at each Newton iteration of the finite difference grid centered reservoir simulator for one or more wells (block 125).

The computer implemented method, according to an exemplary embodiment of the present invention, can also include the step of tracking the sign of the plurality of computed fluid flux vectors 107 (block 129) and determining the drainage boundaries 112 of one or more drainage planes 115 at, e.g., at each at each converged time step and/or Newton iteration of the finite difference grid centered reservoir simulator for one or more wells 119 (block 130) to thereby determine the three-dimensional boundaries 110 of the drainage volume 111 of one or more wells 119.

According to an embodiment of the method, step of determining the drainage boundaries 112 includes selecting, via a second computer process, one or more drainage planes 115 of one or more well segments 117 that include a perforated grid block or cell 113 and are perpendicular to the one or more well segments 117 (block 132). According to another embodiment of the method, for reservoir simulations where multiple wells 119 compete for fluid production, the step of determining the drainage boundaries 110 of one or more drainage volumes 111 can include the step of determining, via the second computer process, each drainage boundary 112 on each of the one or more drainage planes 115 to be the position where the sign of an associated fluid flux vector 107 changes (block. 134). Conversely, for other reservoir simulations where the wells 119 do not compete, the step of determining the three-dimensional boundaries 110 of one or more drainage volumes 111 can also include the step of determining, via the second computer process, each drainage boundary 112 on each of the one or more drainage planes 115: by comparing one or more phase fluxes on the drainage plane 115 along two perpendicular axis of the drainage plane 115 with the phase flux at the perforated grid block 103, and/or by comparing the distance of the respective grid block 103 in question with a default distance (block 136). Finally, for both reservoir simulations where multiple wells 119 compete for fluid production and where the wells 119 are spaced apart such that they do not compete, the step of determining the drainage boundaries 112 can include performing and repeating the above sub-steps to determine the east and west boundaries 112 in the YZ plane, top and bottom boundaries 112 in the XY plane, and north and south boundaries 112 on the ZX plane, for each perforated grid block 113 for each well 119, until complete (block 138).

In addition, the computer implemented method, according to an exemplary embodiment of the present invention, can further include, for example, the steps of computing, via a third computer process, an estimate of the drainage volume 111 of the one or more wells 119, for example, at each converged time step and/or at each of the plurality of Newton iterations in the fully implicit reservoir simulator responsive to the determined boundaries 112 of the drainage planes 115 (block 140), determining the dynamic grid block pressures of each grid block 103 within the drainage volume 111 of each of the one or more wells 119, for example, at each converged time step and/or at each of the plurality of Newton iterations of the fully implicit reservoir simulator (block 160), and computing, via the third computer process, the static well pressures for each of the one or more wells 119, for example, at each converged time step and/or at each Newton iteration of the fully implicit reservoir simulator, by determining the pore volume average of the dynamic grid block pressures of each of the plurality of grid blocks 103, or at least a substantial subset thereof, within the drainage volume 111 of the respective one or more wells 119 (block 170).

According to an embodiment of the present invention, estimated static well pressure for each of the one or more wells 119 is an estimated average static well pressure of the respective effective drainage volume (p_static) determined according to the following calculation:

$$p\_static = [Sum(Vp(k)) * P(k)] \div Sum(Vp(k)),$$

where:
k refers to all grid blocks in the effective drainage volume,
Vp(k) is the pore volume of grid block k within the effective drainage volume,
P(k) is the dynamic pressure of grid block k, and
Sum is the summation operator.

Beneficially, such a computer implemented method according to exemplary embodiments of the present invention can communicate with one or more computer databases to store data used by one or more of the first, second, or third computer processes associated with such a computer implemented method. Particularly, the computer implemented method can include, for example, the steps of storing, via the first computer process, the plurality of fluid flux vectors 107 in a first database 92, storing, via the second computer process, the one or more determined drainage boundaries 112 in a second database 94, storing, via the third computer process, the one or more computed estimates of drainage volume 111 in a third database 96, storing, via the third computer process, the one or more dynamic grid block pressures in a fourth database 98, and storing, via the third computer process, the plurality of static well pressures for the one or more wells 119 in a fifth database 99.

Figure 7:
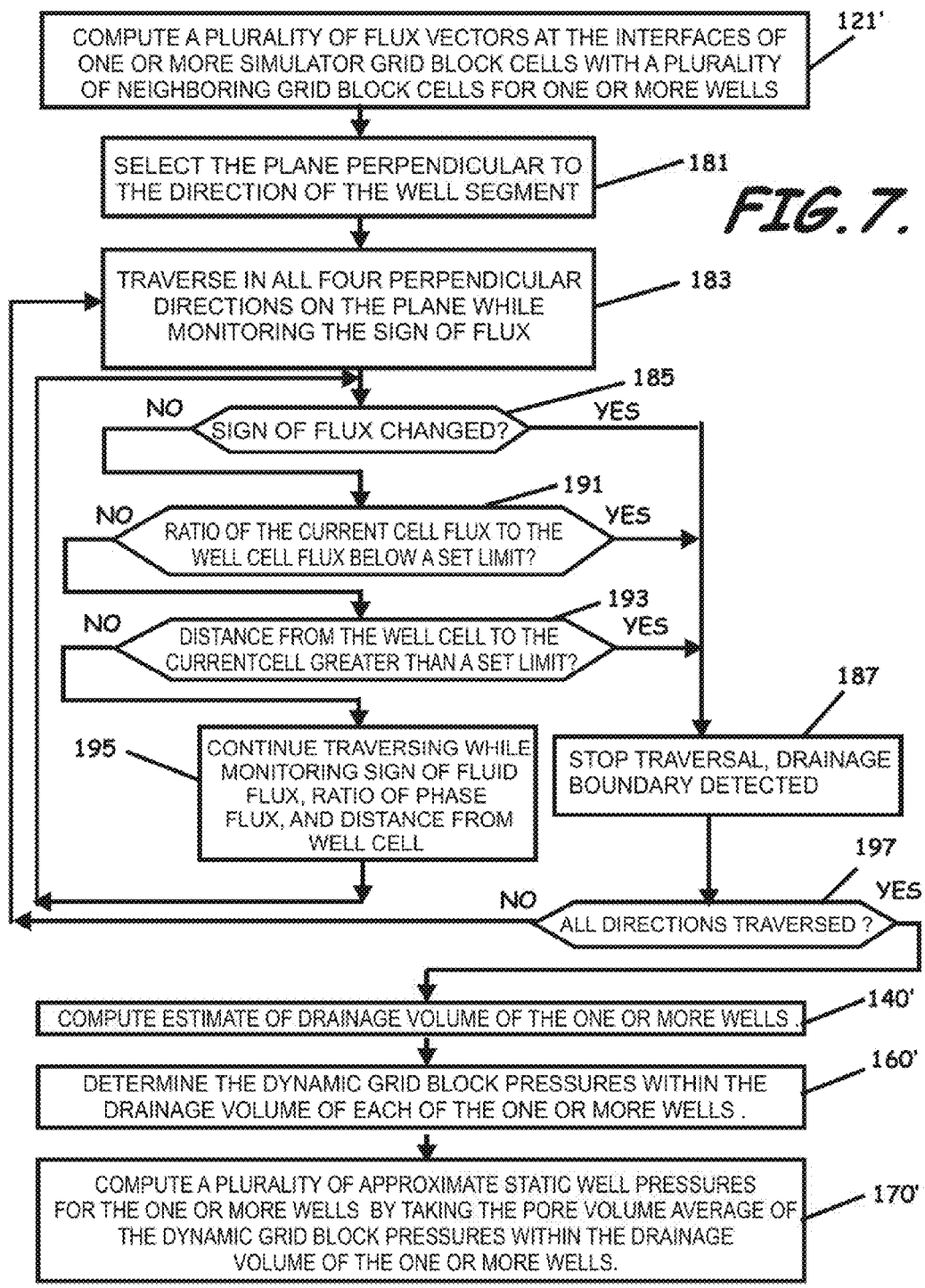
FIG. 7 is a schematic block flow diagram of a computer implemented method to compute a plurality of approximate static well pressures for one or more arbitrary shaped wells according to an exemplary embodiment of the present invention.
Figure 8:
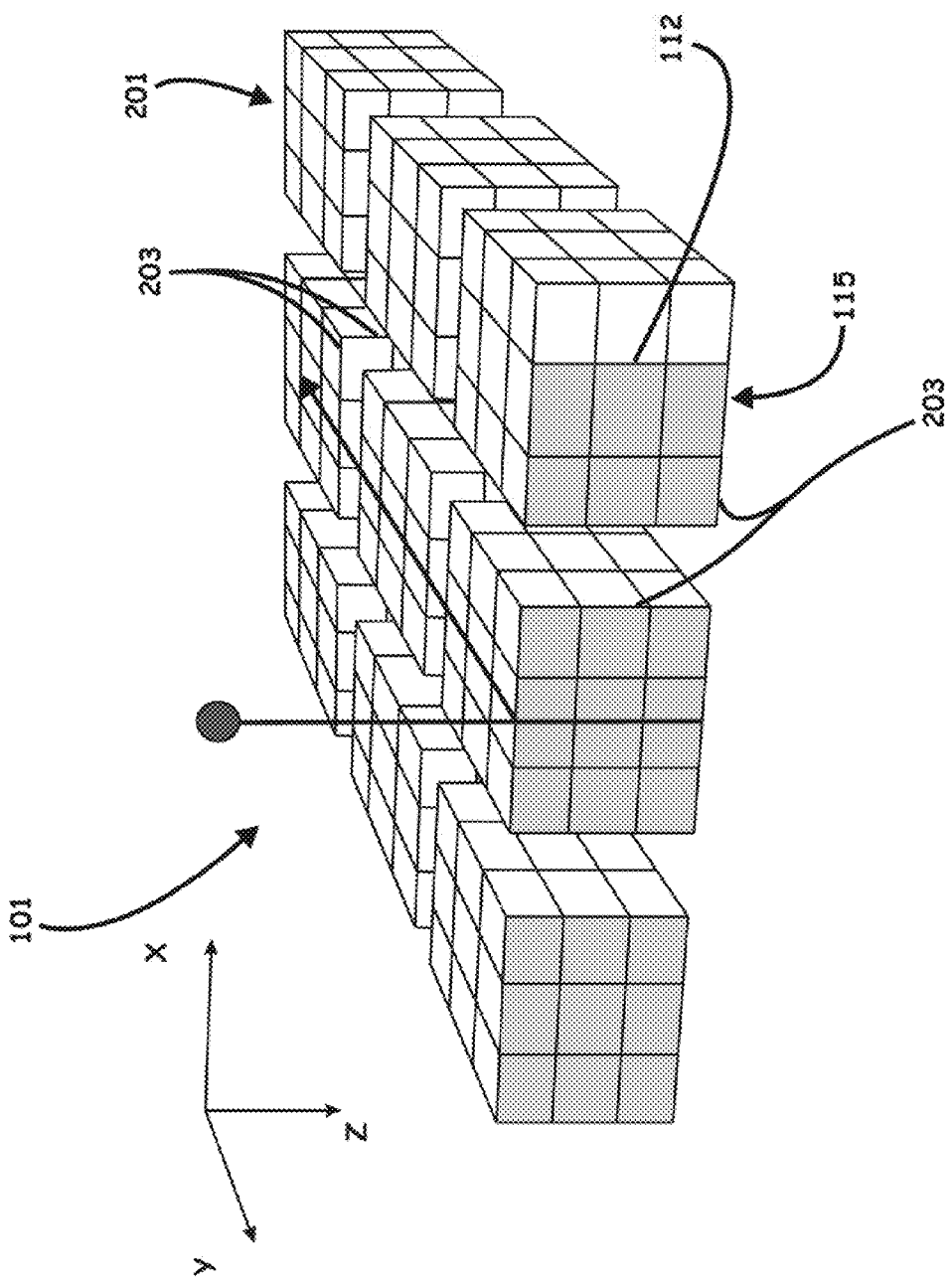
FIG. 8 is an exploded view of a three-dimensional graphical representation of a reservoir illustrating processor domain decomposition according to an embodiment of the present invention.

As perhaps best illustrated in FIG. 7, a computer implemented method according to another embodiment of the present invention, can include, for example, performing for each of one or more wells 119, the step of computing a plurality of fluid flow flux vectors 107 at each of a corresponding plurality of interfaces with neighboring grid blocks 103 along each of one or more drainage planes 115 of a corresponding one or more well segments 117 of a well 119 (block 121'). The steps can also include performing the following to thereby determine each drainage boundary 110 of the drainage volume 111 of the well 119: selecting one or more drainage planes 115 of the well 119 for fluid flow flux analysis (block 181), traversing each of a plurality of grid blocks 103 located along each of four perpendicular directions on the plane defining a plurality of four pathways 120 extending from the respective perforated grid block 113 on the respective drainage plane 115 (block 183), while tracking a sign of each of the plurality of computed fluid flow flux vectors 107 for each of the plurality of grid blocks 103 located along each respective pathway 120, monitoring or otherwise comparing a magnitude of a fluid phase flux for each of the plurality of grid blocks 103 located along the respective pathway 120 with a magnitude of a corresponding fluid phase flux at the perforated grid block 113 for the respective drainage plane 115, and determining a distance of each of the plurality of grid blocks 103 located along the respective pathway 120 extending from the respective perforated grid block 113 on the respective drainage plane 113.

If the sign of the fluid flow flux 107 changes (block 185), the location of the respective grid block 103 (e.g., it's interface or center, as desired) along the respective pathway 120 is considered to be the location of the drainage boundary 112 of the respective drainage plane 115 (see block 187). If not, the process compares a ratio of the magnitude of a fluid phase flux for the respective grid block 103 located along the respective pathway 120 with the magnitude of a corresponding fluid phase flux at the perforated grid block 113 for the respective drainage plane 115, with that of a preselected limit (block 191).

If the ratio of the phase flux for the grid block 103 under evaluation is determined to be below a set limit (block 191), the location of the respective grid block 103 along the respective pathway 120 is considered to be the location of the drainage boundary 112 of the respective drainage plane 115 (block 187). If not, the process compares the distance of the of the respective grid block 103 located along the respective pathway 120 with that of a preselected maximum distance.

If the distance of the grid block 103 under evaluation is determined to be at or above a preselected limit (block 193), the location of the respective grid block 103 along the respective pathway 120 is considered to be the location of the drainage boundary 112 of the respective drainage plane 115 (block 187). If not, the process continues traversing each of a plurality of grid blocks 103 located along the respective pathways 120 extending from the perforated grid block 113 on the respective drainage plane 115 (block 195), while tracking a sign of the computed fluid flow flux vectors 107 for the respective grid block 103 located along the respective pathway 120, monitoring or otherwise comparing the magnitude of the fluid phase flux for the respective grid block 103 with the magnitude of the corresponding fluid phase flux at the perforated grid block 113 for the respective drainage plane 115, and determining the distance of the respective grid block 103.

According to the exemplary configuration, once all four pathways have then traversed through completion (block 197), if not already stored, the process stores the location data and continues. Having such data, the process can continue by executing the steps of determining an estimate of the drainage volume 111 of each well 119 responsive to the determined drainage boundaries 112 of the drainage plane or planes 115 to thereby identify the grid blocks 103 of the reservoir 101 that are contained within the respective drainage volume 111 (block 140'), determining a dynamic grid block pressure of each of the grid blocks 103 contained within the drainage volume 111 of the well 119 (block 160'), and determining a pore volume average of the dynamic grid block pressure of each of, at least a substantial subset of, the plurality of grid blocks 103 contained within the drainage volume 111 of the well 119 to thereby define an estimated static well pressure for the well 119 (block 170').

In addition to functioning with a single reservoir simulator, embodiments of the present invention can be applied beneficially to parallel reservoir simulators. For example, as perhaps best shown in FIG. 8, the parallelization scheme in the reservoir simulator/simulation can include decomposing the entire domain into a set of three dimensional boxes 201 that include a portion of the XY plane and, for example, all of the associated layers 118 of the approximate drainage volume box 111. Various embodiments employing the parallelization scheme can share the well related information among all of the processors 32 via inter-process communication can be carried out, for example, using a standard message passing interface (MPI) protocol. One of the main difficulties arising when computing drainage volume 111 where well related information is shared among multiple processors 32, is difficulties arise in computing draining volume due to the flux traversal in the X and Y direction when transversing a pathway across different processors 32.

Advantageously, an exemplary embodiment of the present invention reduces the aforementioned difficulties, for example, by recording identification, distance, and direction data when the outer limits of a domain boundary 203 of a processor 32 is reached while traversing on the drainage plane 112, e.g., the XY plane, after starting from a perforated grid (cell) block 113 along the X or Y directions, and synchronizing such data with the other processors 32. For example, according to an embodiment of the present invention, if the processor domain boundary 203 for a processor 32 is reached before the drainage boundary in either direction, the traversal is stopped in the current process, and the identification and location of the grid (cell) block 103 at the processor domain boundary 203 and its relation with the particular perforated grid block 113 can be captured in a few arrays for all of the wells 119. Additionally, the direction (X or Y) in which the processor boundary is reached can also be noted. Subsequently, according to an embodiment of the present invention, a single gather-scatter operation using the MPI protocol can be performed to synchronize the gathered data for all of the wells 119 in the reservoir 101 on all of the processors 32. A loop with loop length equal to the number of processors 32 can be established for each direction if there is at least one well 119 with a drainage boundary 112 crossing a processor boundary 203 in that particular direction. As such, the drainage boundary search operation can be picked up on all of the processors 32 in exactly the same manner as it is more commonly done, but only for that particular direction. That is, a gather-scatter operation can be performed whenever a drainage boundary 112 spills over to a neighboring processor 32 in a particular direction. Accordingly, the process described herein can be continued, for example, until either the drainage boundary 112 is reached without crossing a processor domain boundary 203 or until the entire reservoir domain is covered.

Figures 4, 5:
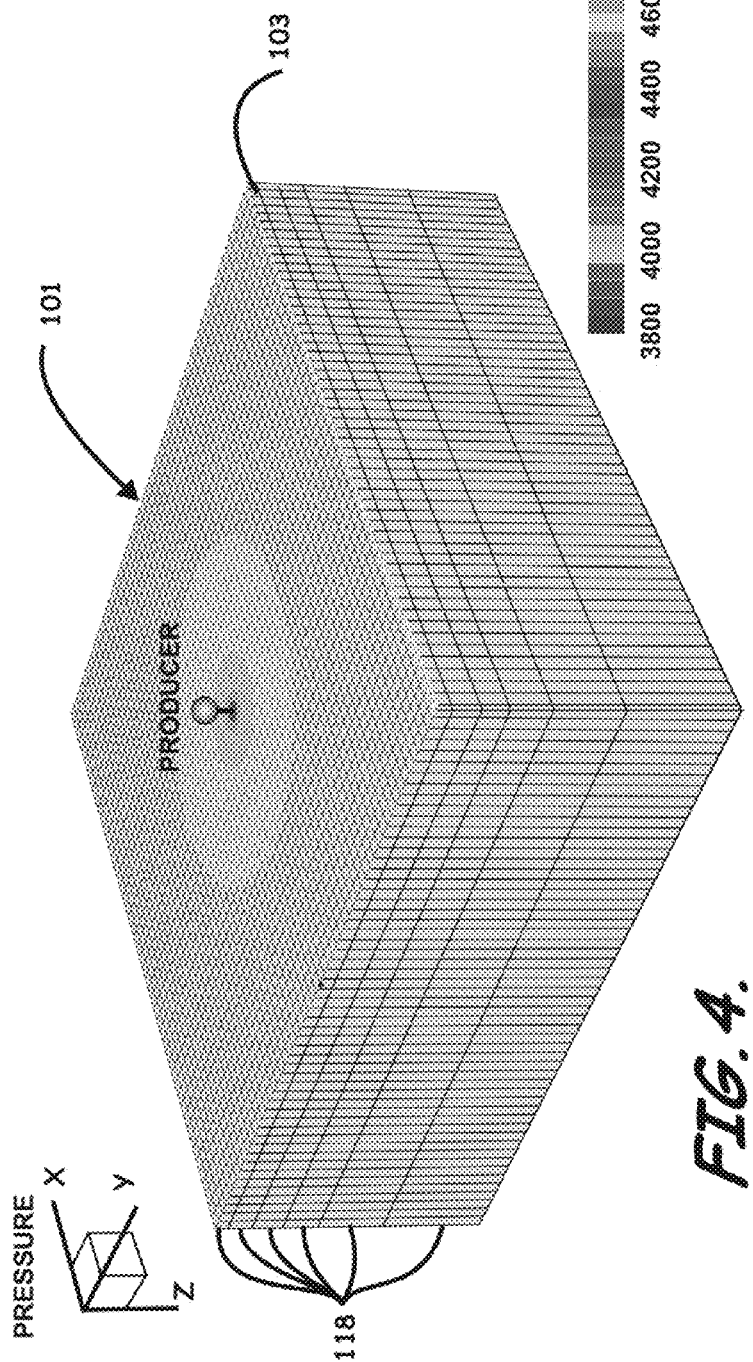
FIG. 4 is graphical representation of a pressure profile of a single well producing from a large reservoir according to an exemplary embodiment of the present invention.
FIG. 5 is a data table including data specifying reservoir dimensions, average properties, and well production rate for a single well case according to an exemplary embodiment of the present invention.
Figure 6:
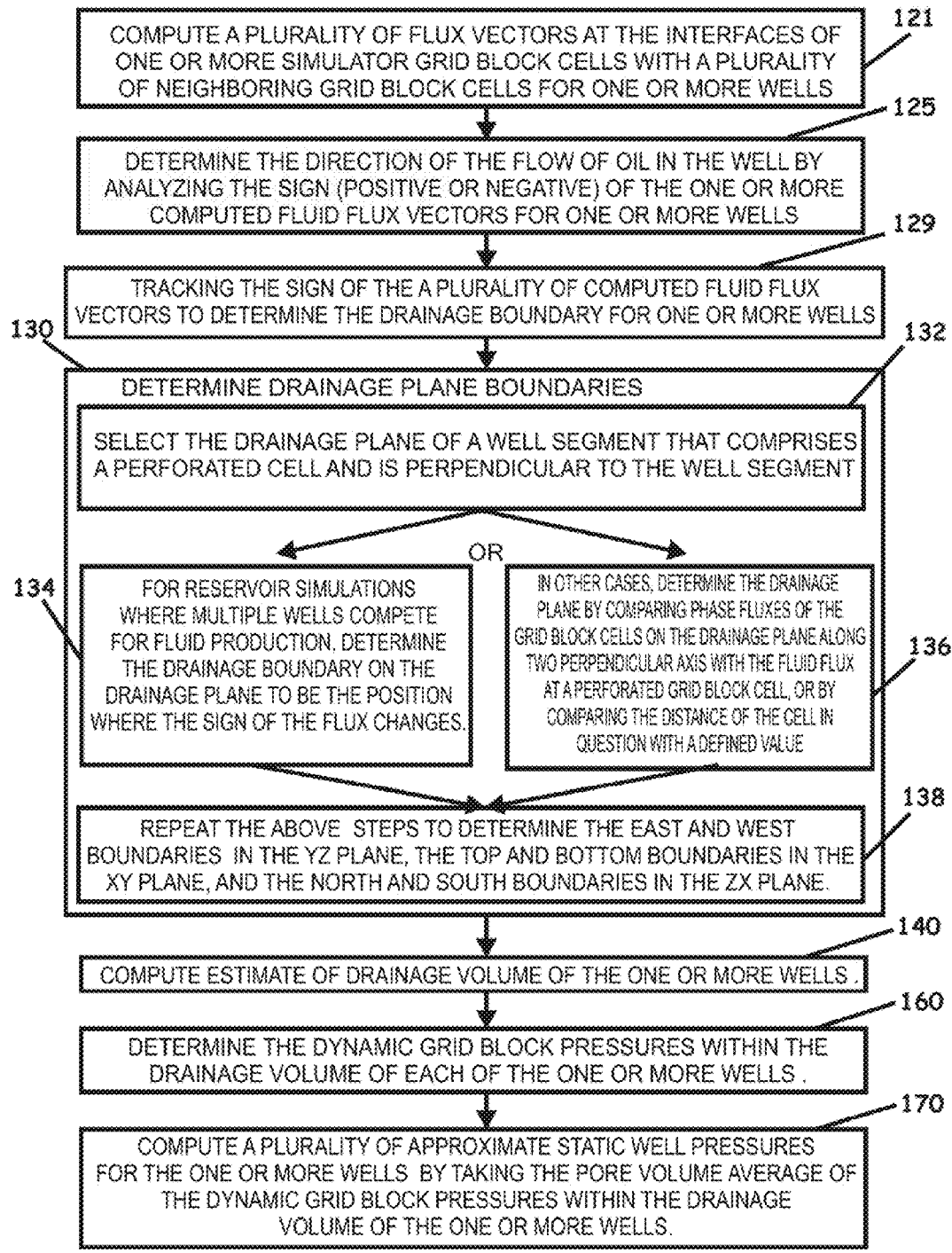
FIG. 6 is a schematic block flow diagram of a computer implemented method to compute a plurality of approximate static well pressures for one or more arbitrary shaped wells according to an exemplary embodiment of the present invention.
Figures 17, 18:
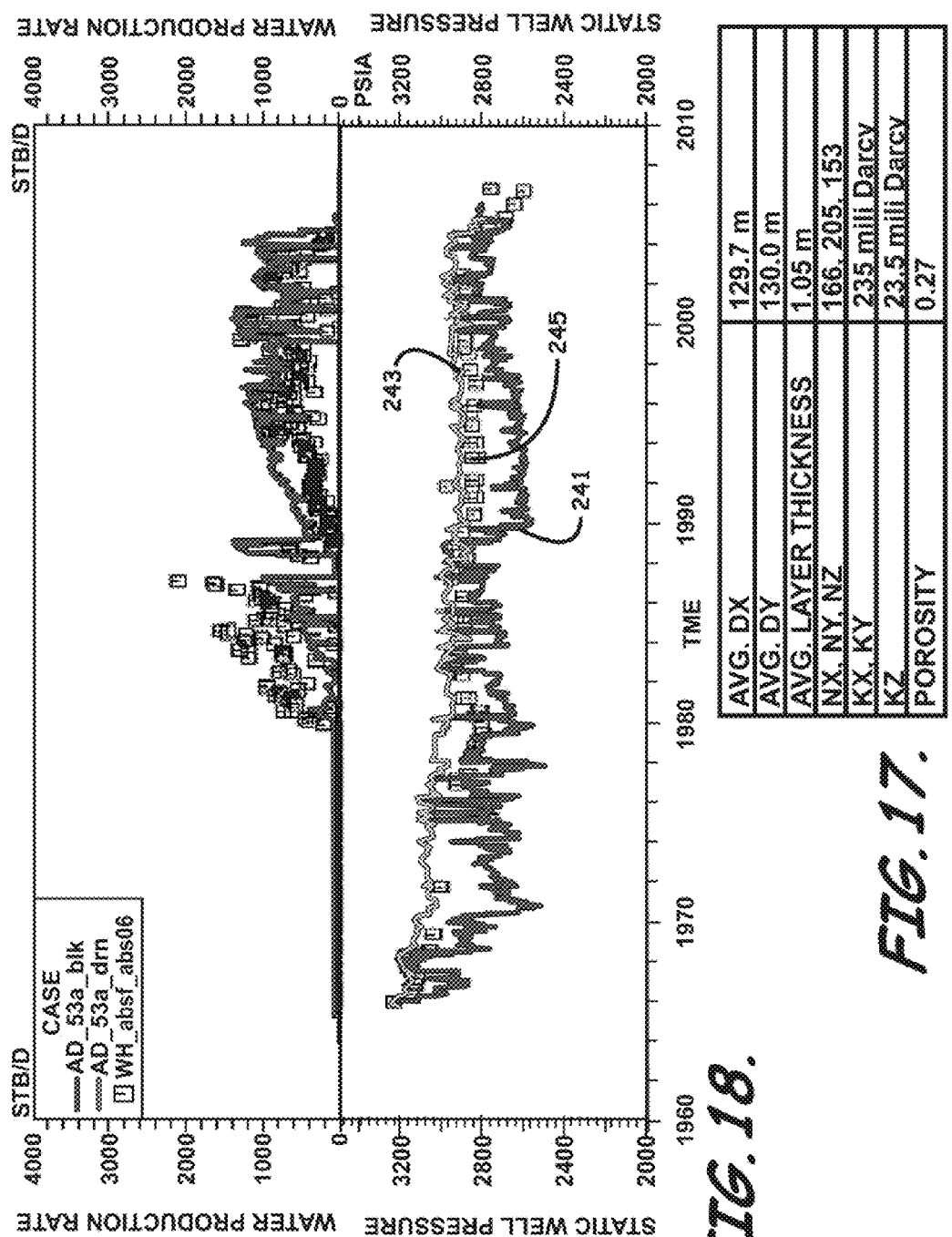
FIG. 17 is a data table including data specifying the average formation, or matrix, properties and grid sizes for a simulation model with five million cells according to an exemplary embodiment of the present invention.
FIG. 18 is a graphical illustration of a plot of observed static well pressures and water production rates, shown as a scatter box, computed static well pressures computed according to a conventional method, and computed static well pressures computed according to an exemplary embodiment of the present invention.
Figure 19:
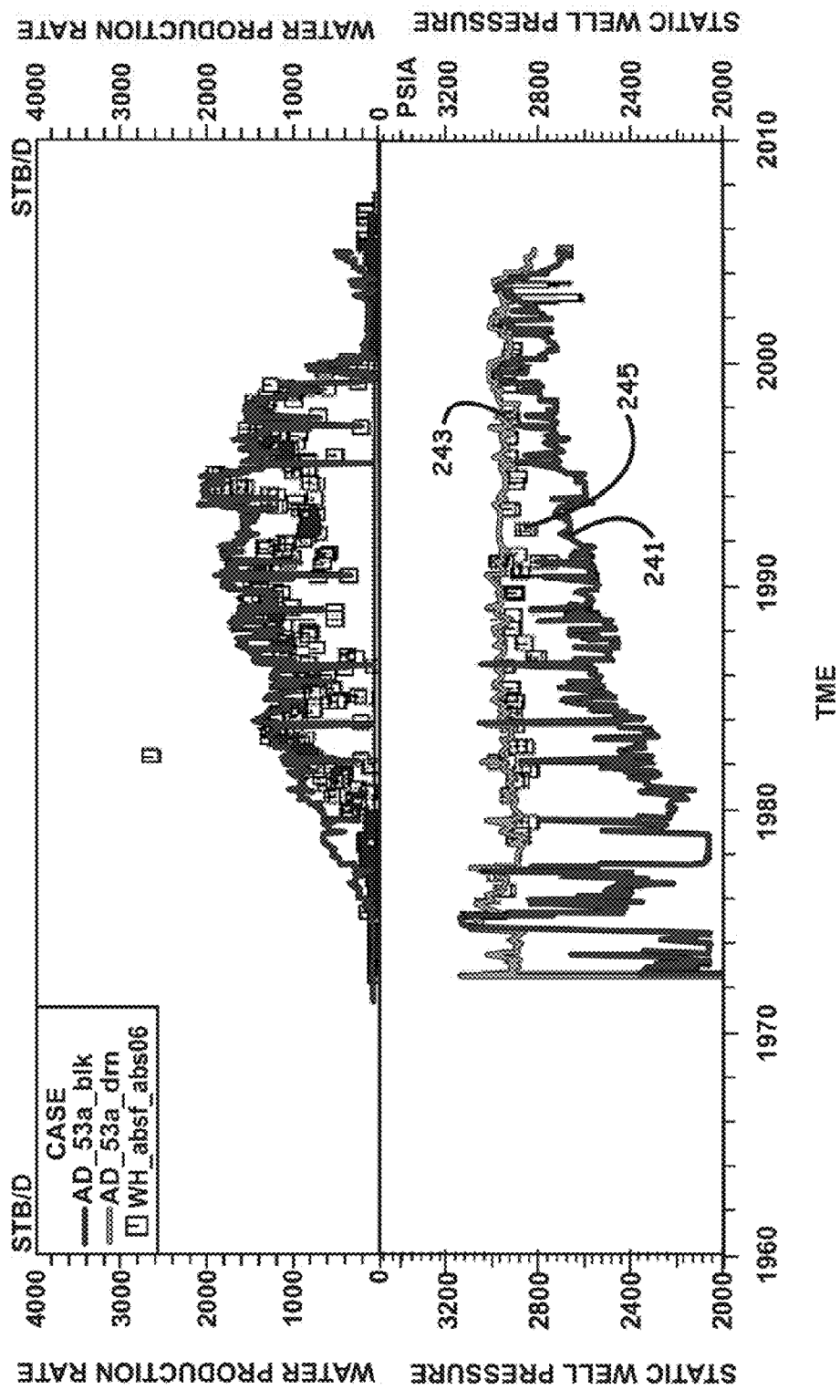
FIG. 19 is a graphical illustration of a plot of observed static well pressures and water production rates, shown as a scatter box, computed static well pressures computed according to a conventional method, and computed static well pressures computed according to an exemplary embodiment of the present invention.

As perhaps best shown in FIGS. 2, 4, 5, 13, 14, 15, and 16, as examples of various embodiments of the present invention, a computer implemented method to compute approximate well drainage pressure for a fully implicit reservoir simulator is demonstrated on an exemplary simulation model with a single vertical well 119 (see e.g., FIGS. 2, 4, 11, 13, 12, and 14), on an exemplary simulation model with multiple vertical wells 119 producing at different rates (see, e.g., FIGS. 15 and 16), and on a real field simulation study of a fractured carbonate reservoir using five million cells (see, e.g., FIGS. 17, 18 and 19). Consider, for example, a single vertical well 119 producing from a large three dimensional reservoir 101 according to the reservoir profile shown, for example, in FIGS. 4 and 5. In this particular example, a 55×55×6 grid is used with constant aerial grid size of $\Delta x=\Delta y=200$ m with vertical layer thicknesses were 10, 10, 15, 15, 25, 25 feet, respectively. Additionally, the initial reservoir pressure in this exemplary simulation is set to approximately 4,000 psi, and the reservoir simulation is based upon was produced above its bubble point for the test runs with an oil viscosity was about 0.5 cp. For purposes of this exemplary simulation, a vertical well 119 completed in all layers 118 was placed in the middle of the model reservoir 101. The well 119 was put on a constant production rate of 10,000 B/D for a period of one year. FIG. 4, for example, illustrates the pressure distribution due to such a constant production rate in a homogeneous and isotropic three dimensional reservoir.

Figure 9:
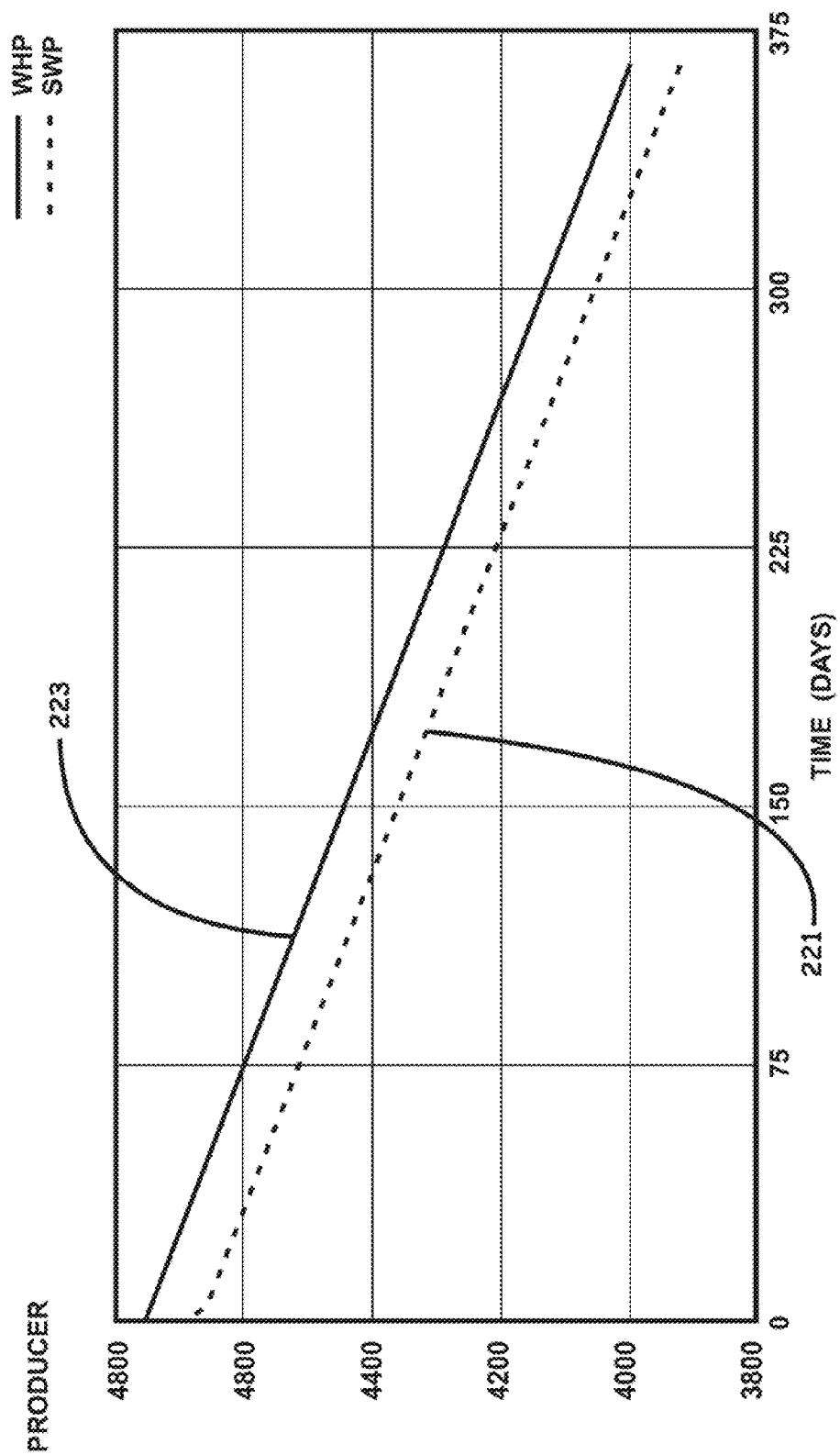
FIG. 9 is a graphical illustration of a plot of reservoir simulator computed and observed well static pressure using a conventional method for a single well case with 500 miliDarcy permeability.

Referring to FIG. 9, using the above described exemplary reservoir 101, a conventional method of computing well drainage pressures for a single vertical well in a large three-dimensional reservoir was compared to observe the pressure data obtained from a pressure buildup test. As is perhaps best illustrated by the lower, dashed line at 221 reflecting the results of the conventional method, the static well pressures for this exemplary well 119 were obtained by the pore volume average of grid block pressures for the perforated cells (grid blocks in which the well is perforated) at each time step. The actual static well pressures for several time intervals were obtained by simulating pressure build-up tests at the end of each month. The well was shut in for several days such that the pore volume averaged well block pressures did not change. These values were assumed to be the static well pressures and were accordingly plotted as the upper line at 223 in FIG. 9.

An examination of FIG. 9 reveals that the plots 221, 223, showing the approximate well drainage pressures for a single vertical well calculated using a conventional method and the actual static well pressures calculated using a simulated pressure build-up test, are about 100 psi different. In summation, if pore volume averaged perforated grid block pressures are used as a proxy for static well pressures according to a conventional method, the resulting history match errors can be substantial—in this scenario, as high as 100 psi when compared to actual static well pressures. Using the conventional method, as illustrated above, in order to match the simulated static well pressures (lower line at 221) with the actual observed static well pressures (upper line at 223), actual data values such as the permeability of the reservoir, must be manipulated in order to force the data to substantially match actual static well pressures. In this example, as perhaps best shown in FIG. 10, permeability is multiplied by a factor of six in order to try to cause a history match, albeit one that is unrealistic. That is, although the data manipulation results in a fair match, the resulting permeability of the reservoir in the simulation is incorrect and accordingly may yield different field performance results for gas oil reserves (GOR), water cuts, and similar behaviors for a real reservoir case.

Figure 10:
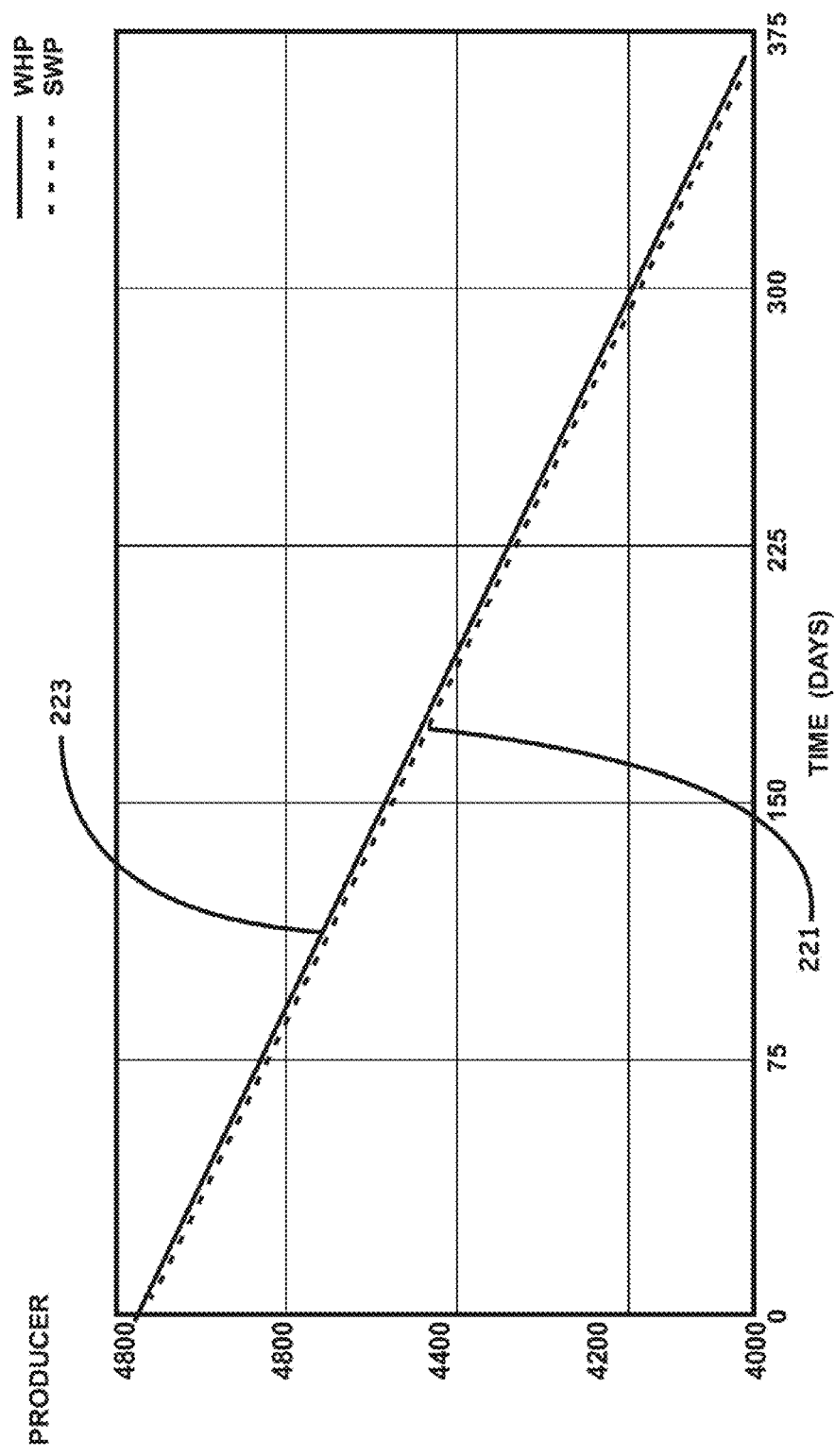
FIG. 10 is a graphical illustration of a plot of simulator computed and observed well static pressure using a conventional method for a single well case with 3000 miliDarcy permeability.
Figure 11:
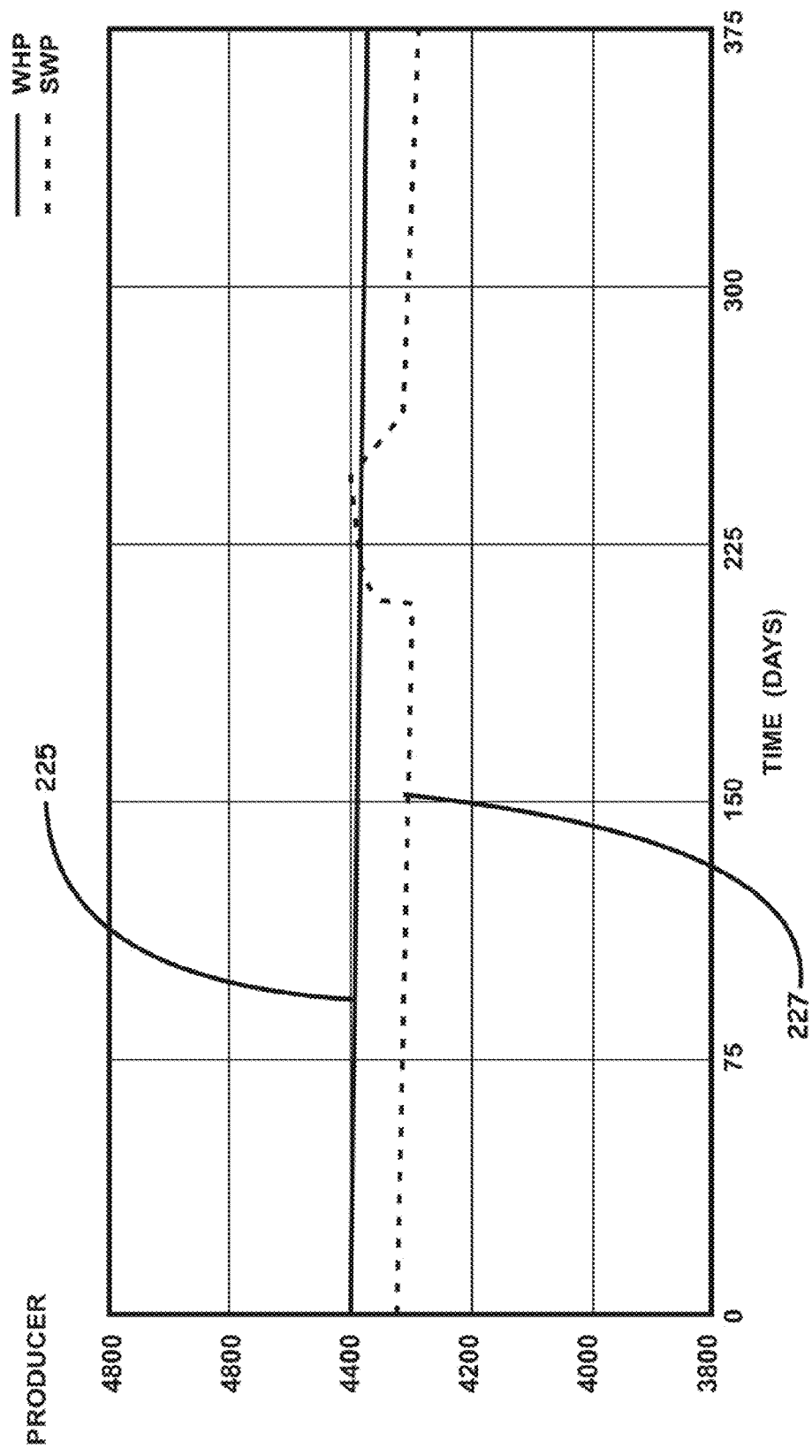
FIG. 11 is a graphical illustration of a plot of simulator computed well static pressure using a conventional method and simulator computed well static pressure using a method according to an exemplary embodiment of the present invention for a single well showing shut-in of the well for one day.
Figure 12:
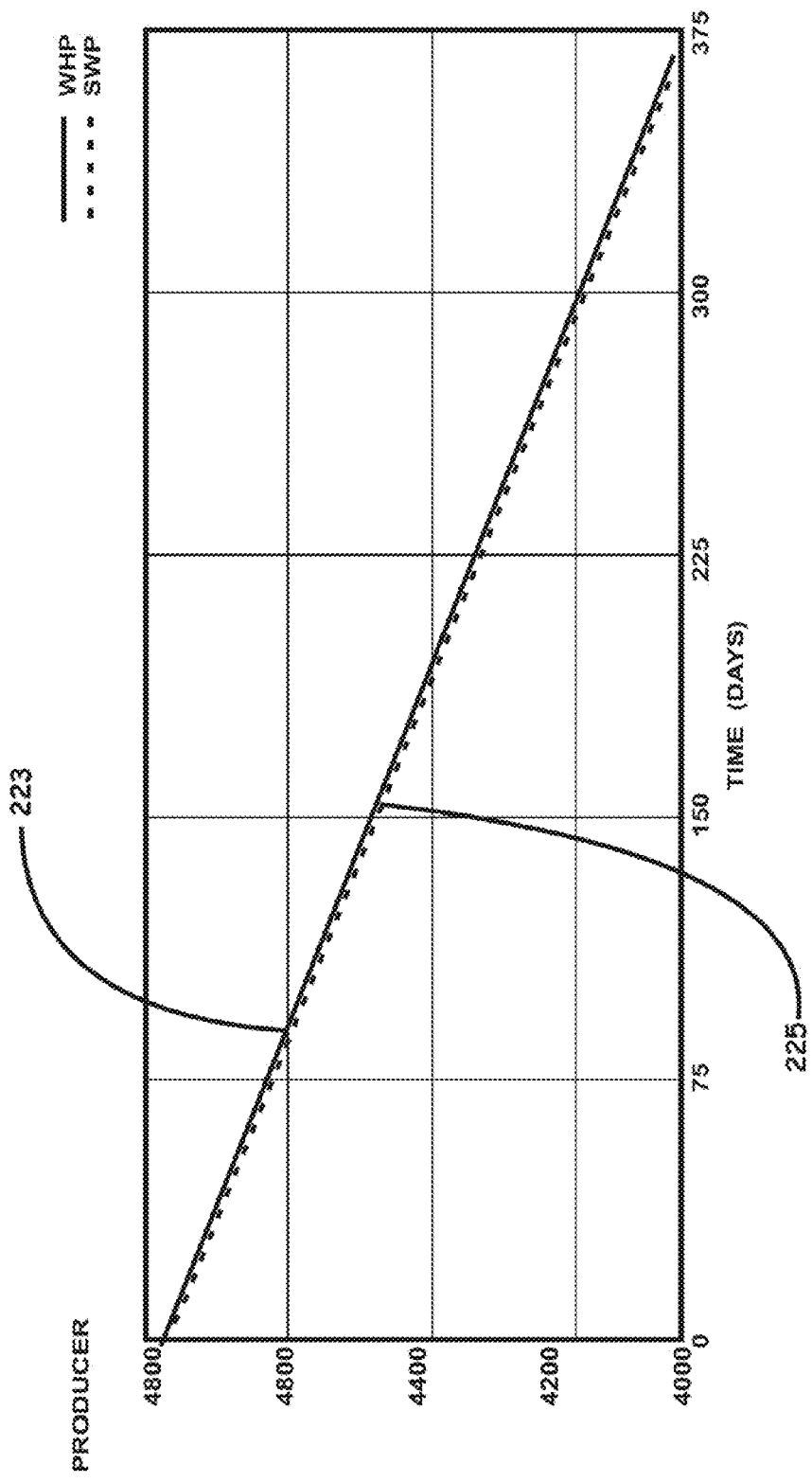
FIG. 12 is a graphical illustration of a plot of simulator computed static well pressures and observed static well pressures for a single well with 500 miliDarcy permeability according to an exemplary embodiment of the present invention.

Conversely, as perhaps best illustrated in FIG. 11, a method according to an exemplary embodiment of the present invention was also applied to the above described exemplary single vertical well 119 to provide comparative results. According to the exemplary method according to the present invention, the grid block pressures of the grid blocks within the effective drainage volume 111 calculated from the flux maps at each time step were used to calculate drainage volume averaged static well pressures illustrated as the solid line at 225 in FIG. 11. The static well pressures calculated using a conventional method are also shown, for example, as the dashed line at 227 in FIG. 11. As illustrated in FIG. 11, the conventional method under predicts the static well pressure while the exemplary method according to embodiments of the present invention calculate much higher static well pressures in the order of 100 psi. To verify the correctness of the exemplary method according to embodiments of the present invention, the exemplary well was shut in, as a part of the simulation, for a few days as is perhaps best illustrated in FIG. 12. As seen in FIG. 12, the shut in static well pressures shown at 223 are particularly close to the pressures computed by the exemplary method according to embodiments of the present invention shown at 225 thereby indicating that the exemplary method according to embodiments of the present invention correctly computes the static well pressures without the need for arbitrary correction factors that ultimately result in increased inaccuracy and an unrealistic reservoir model. Note, as is illustrated in FIGS. 9-10, according to this particular scenario, in order to use the static well pressures calculated using a conventional method to verify the validity of a the reservoir simulator as a predictive model, the permeability factor of the model had to be multiplied by a factor of six to a new value of three Darcy to thereby create a static well pressure history match that is within 8 psi of the actual observed static well pressures. Under a different set of conditions, it would be expected that some other factor would need to be determined and applied.

Figure 13:
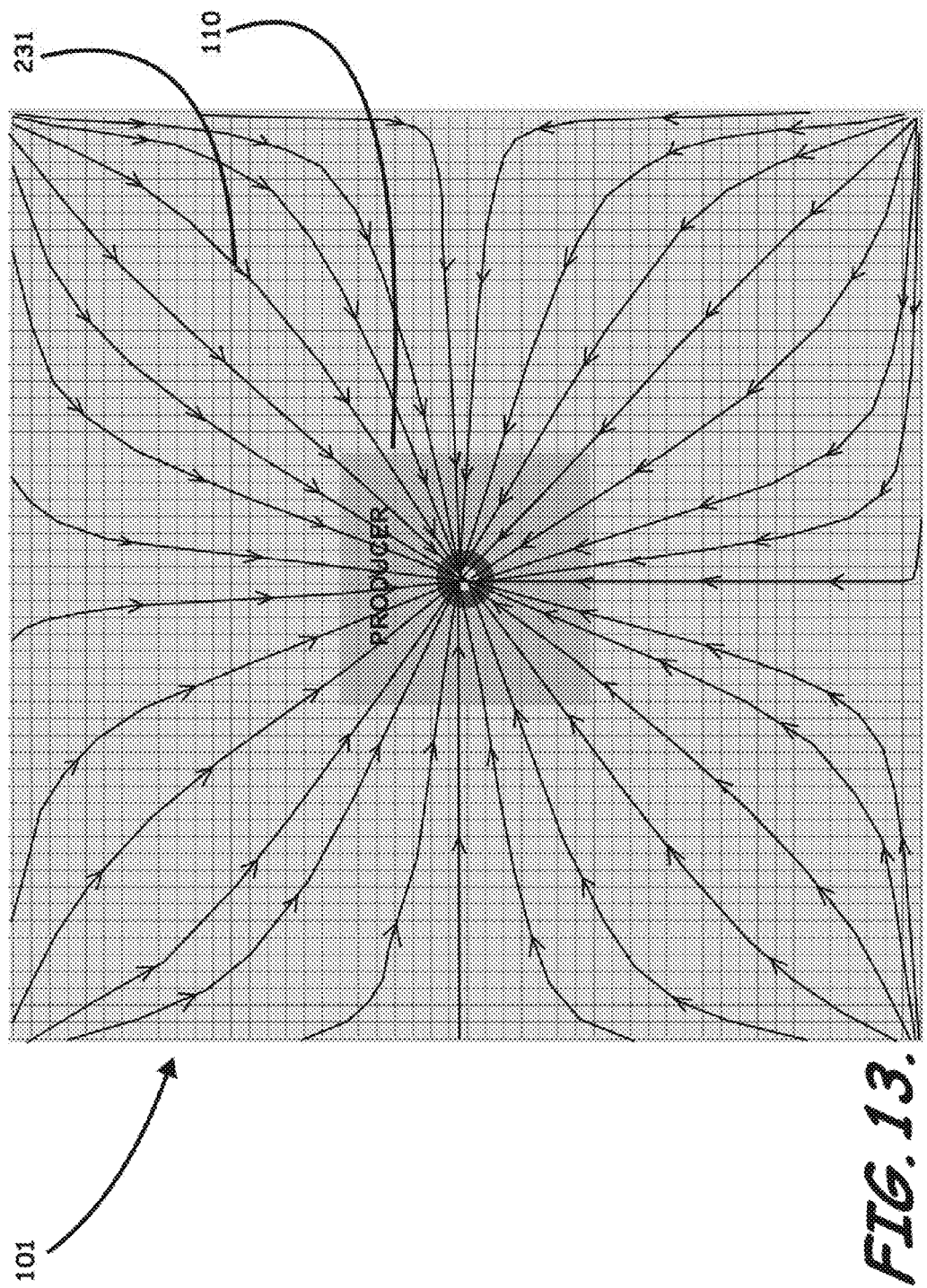
FIG. 13 is a graphical illustration of a plot of streamlines generated from computed flux maps during a simulated run of a reservoir simulator for a single well showing both the streamlines, or steamtraces, and the simulator computed approximate drainage boxes for the single well according to an exemplary embodiment of the present invention.
Figure 14:
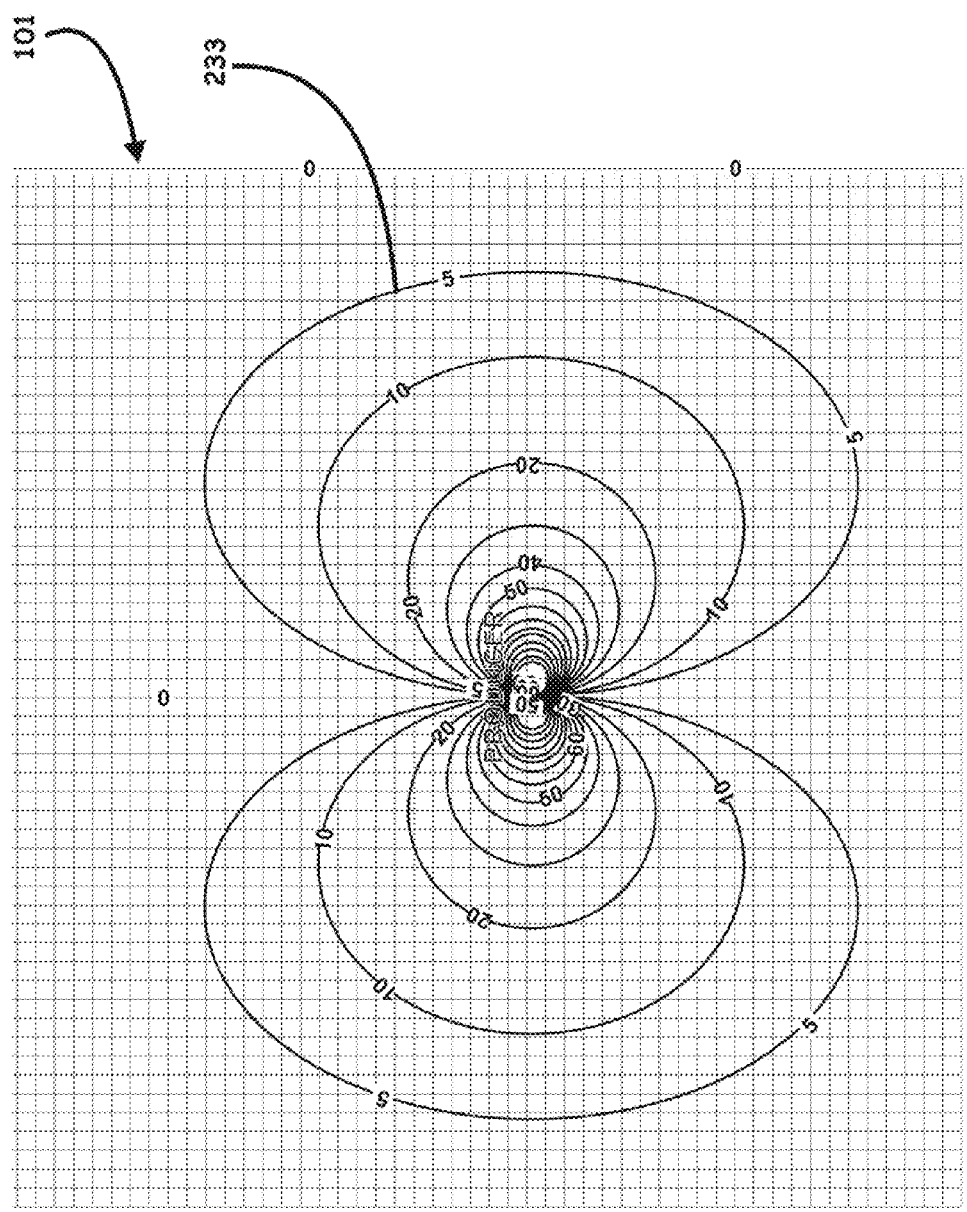
FIG. 14 is a graphical illustration of a plot of X directional oil flux contours that shows the decline of the flux that is used in determining the draining box depicted in FIG. 13 according to an exemplary embodiment of the present invention.

According to an exemplary embodiment of the present invention, streamlines can be generated from the one or more computed flux maps during a simulation run. Streamlines can, for example, be beneficial in understanding the boundaries of the well drainage volume 111. FIG. 13, for example, illustrates the streamlines 231 for the exemplary single vertical well 119 described in detail above. Additionally, FIG. 13 illustrates the approximate drainage area volume box (on the top layer 118) used for calculating drainage volume average pressure for the well 119. Note, the drainage area illustrated in FIG. 13 was based on the decline of the oil flux to 5% of the value of the oil flux at the perforated grid block (cell) 113 located in the center of the figure. FIG. 14 depicts X directional oil flux contours 233 that show, for example, the decline of the fluid flow flux that is used (tracked) to determine the approximate drainage volume box depicted in FIG. 13. Additionally, FIG. 12 illustrates a static well pressure history match according to an exemplary embodiment of the present invention. The observed static well pressures shown at 223 were computed, for purposes of this example, from simulated pressure build-up data while shitting in the well for one day using a Homer plot. It can be seen that the computed static well pressures according to an embodiment of the present invention shown at 225 closely match the observed static well pressures, and hence, no permeability modification factors were needed to create an accurate simulated static well pressure for purposes of history matching.

Figure 15:
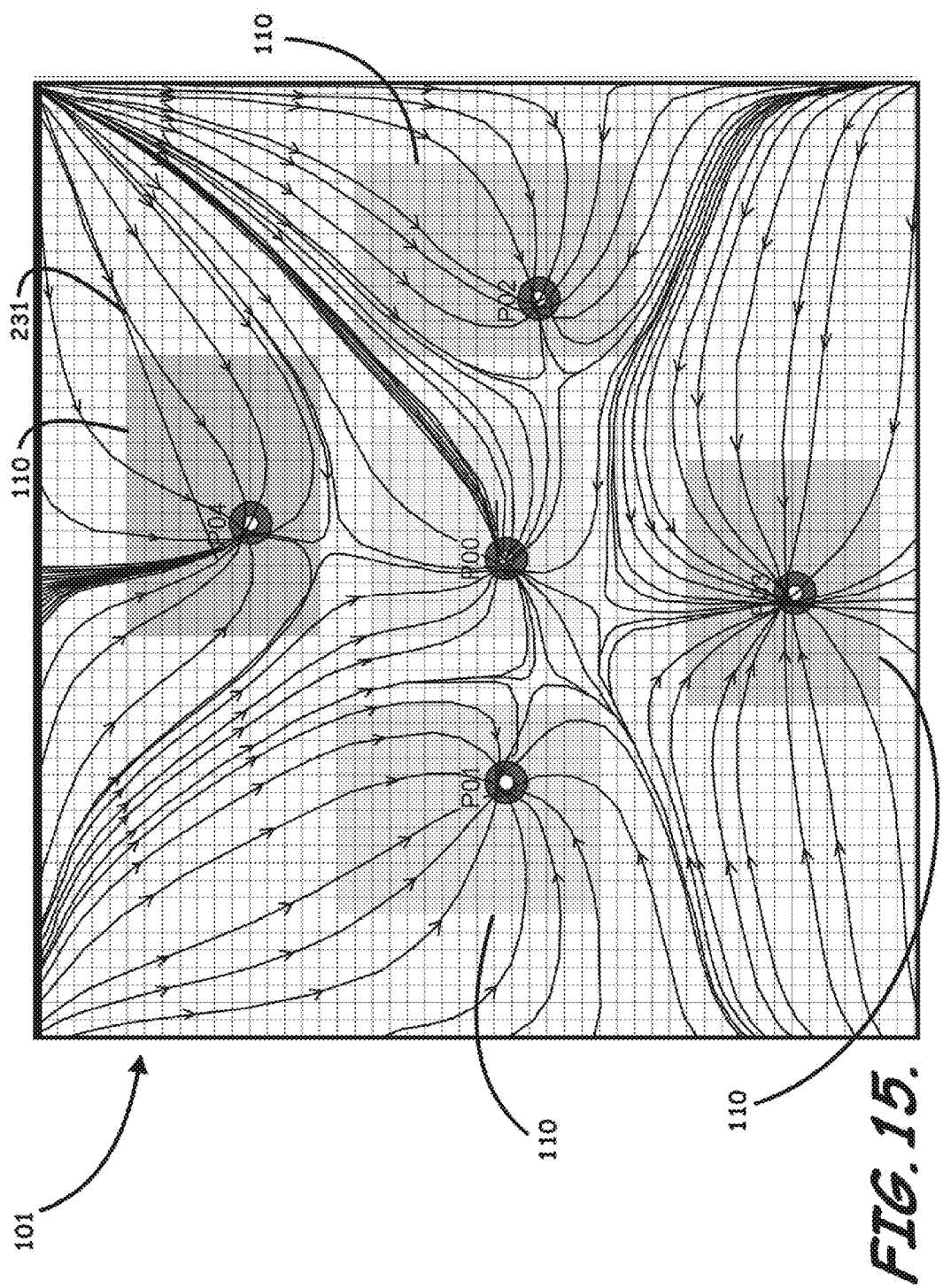
FIG. 15 is a graphical illustration of a plot of an actual drainage area of a well as shown with streamtraces and the reservoir simulator computed approximate drainage boxes for five asymmetrically located producers according to an exemplary embodiment of the present invention.
Figure 16:
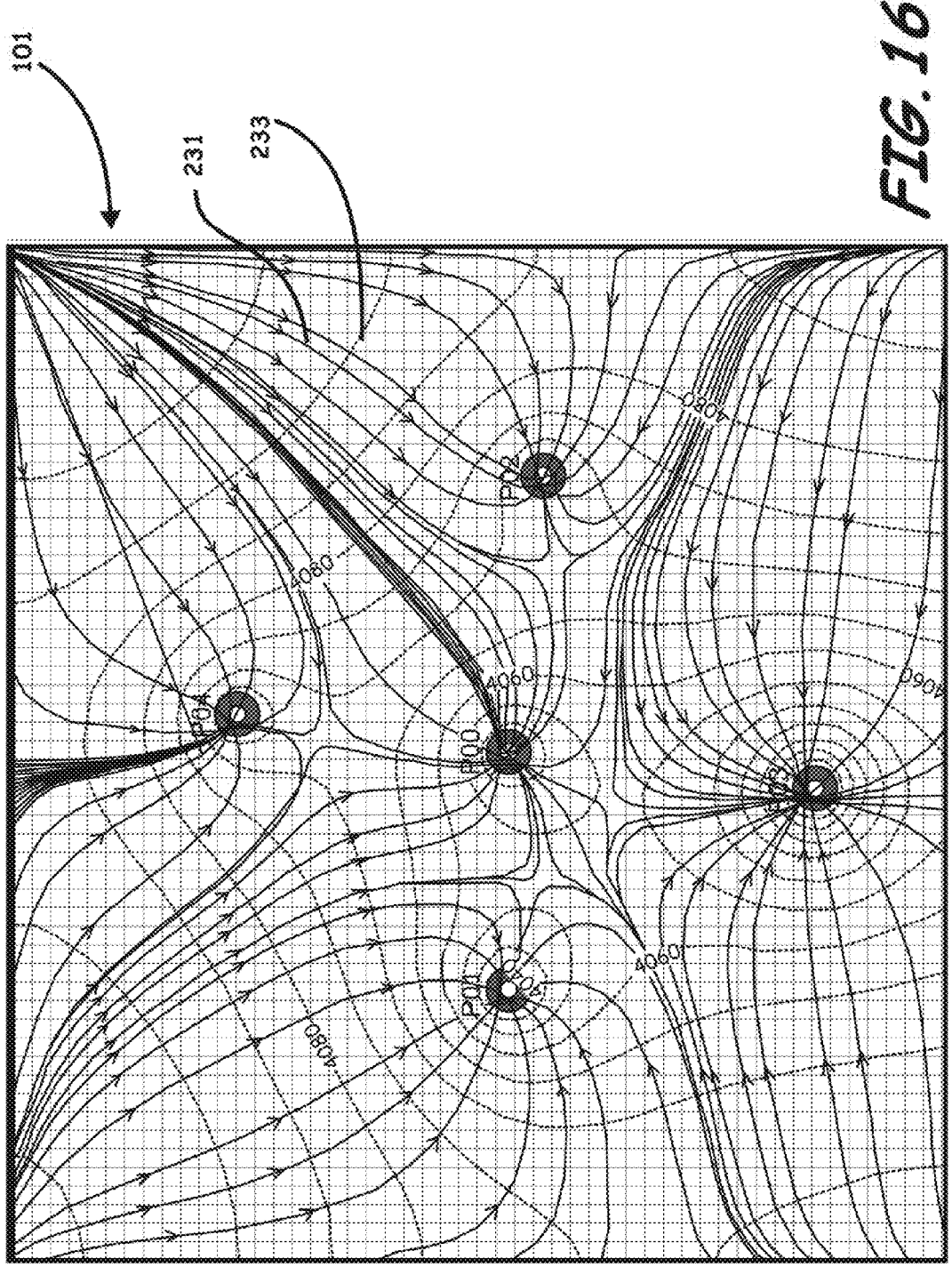
FIG. 16 is a graphical illustration of a plot of equipotential surface contours and the streamtraces for five asymmetrically located producers according to an exemplary embodiment of the present invention.

Similar, beneficial results can be achieved when a method according to embodiments of the present invention is applied to multiple wells producing in the same reservoir. FIG. 15, for example, illustrates five different asymmetrically located exemplary producing wells 119 operating in the same exemplary model reservoir 101. The exemplary wells 119 are completed vertically in all the layers 118 and produce at oil rates of 1600 B/D, 2100 B/D, 1200 B/D, 3200 B/D and 1600 B/D for wells 119. The drainage areas 110 on the drainage plane 115 estimated by a method according to an exemplary embodiment of the present invention are also illustrated, by way of example in the figure via shading, and are each labeled P00, P01, P02, P03 and P04, respectively, according to the particular oil well 119 associated with each drainage area 110. Streamlines 231 are also plotted in FIG. 15 to illustrate the drainage associated with each drainage plane 115. More specifically, the rectangular boxes shown in the figure and representing the respective drainage areas 110 of each of the wells 119 in two dimensions are supported by the streamlines 231 which when crossing the outer drainage boundaries of the drainage area 110 indicate the direction of oil flow. By way of example, it should be noted that the drainage areas 110 depicted in the figure are all consistent with the streamlines 231. By way of further example, FIG. 16 which illustrate equipotential lines 235 that are perpendicular to the streamlines 231 depicted in FIG. 15 and which indicate regions in space where every point in the region of space is at the same potential, are consistent with the drainage areas 110 determined for this particular example according to an embodiment of the present invention.

Exemplary methods according to embodiments of the present invention, as illustrated above, can also be, for example, implemented in a large fractured carbonate reservoir. For example, a simulation model with five million grid block cells can be constructed according to the average formation, or matrix, properties and grid sizes listed in FIG. 17. Accordingly, FIG. 18 and FIG. 19 illustrate, each for a different well 119, the history match of static well pressures using a conventional method as well as an exemplary method according to embodiments of the present invention. The squares in FIGS. 18 and 19 represent the measured oil field performance, specifically, water production rate in the upper portion of figures and static well pressures in the lower portion of the figures. In the lower portion of the figures, the lower line at 241 represents simulator calculated performance based on static well pressures according to a conventional method, while the upper line at 243 represents the static well pressures computed according to an exemplary embodiment of the present invention. As is illustrated, the static well pressures calculated according to a conventional method deviate significantly from the measured static well pressures shown at 245. I.e., the static well pressures calculated according to a conventional method under predict the actual performance of the well. Conversely, the static well pressures calculated according to variously embodiments of the present invention closely predict the actual field measured static well pressures. Therefore, it is evident that variously embodiments of the present invention beneficially eliminate the necessity of unrealistic permeability modifiers which ultimately result in an unrealistic history match.

Various embodiments of the present invention provide the following primary benefits: (1) they can produce more accurate results than conventional methods for computed static well pressures as compared to actual observed field data static well pressures; (2) they are cost effective for a fully implicit simulator because embodiments of the present invention utilize phase fluxes, which are already calculated as a part of a fully implicit simulator process, across the cell boundaries at every iteration for every time step; (3) they work well in oil field simulations while preventing the introduction of unrealistic permeability modifications; (4) they are not limited to any particular well shape; and (5) they can be advantageously applied in a parallel simulator environment by transferring data among processes when drainage volumes span multiple processor domains.

It is important to note that while embodiments of the present invention have been described in the context of a fully functional system, those skilled in the art will appreciate that the mechanism of at least portions of the present invention or aspects thereof are capable of being distributed in the form of a computer readable program product stored in a tangible computer medium and a computer readable medium comprising or otherwise containing instructions in a variety of forms for execution on a processor, processors, or the like, and that the present invention applies equally regardless of the particular type of signal bearing media used to actually carry out the distribution. Note, the computer readable program product can be in the form of microcode, programs, routines, and symbolic languages that provide a specific set or sets of ordered operations that control the functioning of the hardware and direct its operation, as known and understood by those skilled in the art. Examples of computer readable media include but are not limited to: nonvolatile hard-coded type media such as read only memories (ROMs), CD-ROMs, and DVD-ROMs, or erasable, electrically programmable read only memories (EEPROMs), recordable type media such as floppy disks, hard disk drives, solid state disk drives, hard disk RAIDs, direct attached storage devices, CD-R/RWs, DVD-RAMs, DVD-R/RWs, DVD+R/RWs, flash drives, memory sticks, HD-DVDs, mini disks, laser disks, Blu-ray disks, and other newer types of memories, and transmission type media such as digital and analog communication links as are known and understood by those skilled in the art that are capable of storing the instructions. For example, such media can include operating instructions and operations instructions related to the reservoir modeling program product 50 and the computer executable portions of the method steps according to the various embodiments of the methods described above to determine a plurality of approximate static well pressures for one or more arbitrary shaped wells 119 in a reservoir 101. Additionally, as noted above, the reservoir simulator computer 30 shown schematically in FIG. 1 can represent a computer or computer cluster or computer farm and are not limited to any individual physical computers. The number of computers along with associated storage capacity and their architecture and configuration can be increased based on usage, demand, and capacity requirements for the system. Note additionally, the processor(s) 32 is not limited to any single processor, or processor type and can include any number of central processing units, microprocessors, graphics processing units, digital signal processors, network processors, coprocessors, data processors, audio processors, and any other electronic circuits that can evaluate computer readable instructions as is known and understood to those skilled in the art. Also note, the memory 40 can include volatile and nonvolatile memory known to those skilled in the art including, for example, RAM, ROM, and magnetic or optical disks, just to name a few.

In the drawings and specification, there have been disclosed a typical preferred embodiment of the invention, and although specific terms are employed, the terms are used in a descriptive sense only and not for purposes of limitation. The invention has been described in considerable detail with specific reference to these various illustrated embodiments. It will be apparent, however, that various modifications and changes can be made within the spirit and scope of the invention as described in the foregoing specification and as defined in the appended claims.

That claimed is:

1. A system to determine static well pressures for one or more arbitrary shaped wells in both homogeneous and heterogeneous reservoirs, the system comprising:

a reservoir simulator computer having a plurality of processors, an input device, an output device, a memory containing first, second, third, fourth, and fifth databases, the first database including a plurality of fluid flow flux vectors, the second database including a plurality of drainage boundaries, the third database including a plurality of effective drainage volumes, the fourth database including a plurality of grid block pressures, and the fifth database including a plurality of computed static well pressures;

fluid flux program product to determine fluid flux between adjacent grid blocks, the fluid flux program product stored in the memory of the reservoir simulator computer and comprising instructions that when executed by the reservoir simulator computer, cause the reservoir simulator computer to perform, for each of a plurality of grid blocks contained within an effective drainage volume of each of one or more wells at each Newton iteration of a finite difference grid centered reservoir simulator, the operations of:

computing a plurality of fluid flow flux vectors at each of a corresponding plurality of interfaces with a plurality of neighboring grid blocks, and storing the plurality of fluid flow flux vectors in the first database;

drainage boundary program product to determine three-dimensional boundaries of the effective drainage volume for each of the one or more wells, the drainage boundary program product stored in the memory of the reservoir simulator computer and comprising instructions that when executed by the reservoir simulator computer cause the reservoir simulator computer, to perform for each of one or more drainage planes of a respective one or more well segments each oriented perpendicular to a direction of the one or more well segments of the respective one or more wells and including a face of a perforated grid block and a face of each of a plurality of grid blocks adjacent thereto, the operations of:

performing the following on each of the plurality of grid blocks located along each separate one of a plurality of directions defining a plurality of pathways extending outward from the respective perforated grid block on the respective drainage plane:

tracking a sign of each of the plurality of computed fluid flow flux vectors for each of a plurality of grid blocks located along the respective pathway extending from the respective perforated grid block on the respective drainage plane, comparing a magnitude of a phase flux along two perpendicular axes for each of the plurality of grid blocks located along the respective pathway extending from the respective perforated grid block on the respective drainage plane with a magnitude of a corresponding phase flux at the perforated grid block for the respective drainage plane, and determining a distance of each of the plurality of grid blocks located along the respective pathway extending from the respective perforated grid block on the respective drainage plane, and determining a location of each separate drainage boundary along each corresponding separate one of the plurality of pathways extending from the respective perforated grid block on the respective drainage plane for each of the one or more well segments for each of the one or more wells to thereby estimate the effective drainage volume of each of the one or more wells, the location of each drainage boundary of each separate drainage plane of the one or more drainage planes being at a respective one of the following locations having a lesser distance from the respective perforated grid block than each other of the following locations:

a location of one of the plurality of grid blocks along the respective pathway from the respective perforated grid block on the respective drainage plane where a change in the sign of the associated fluid flow flux vector for the one of the plurality of grid blocks from the sign of the associated fluid flow flux vector of an adjacent prior traversed one of the plurality of grid blocks along the respective pathway is first encountered when traversing the respective pathway from the respective perforated grid block on the respective drainage plane, a location of one of the plurality of grid blocks along the respective pathway from the respective perforated grid block on the respective drainage plane where a phase flux ratio of the magnitude of the phase flux of the respective one of the plurality of grid blocks to the magnitude of the corresponding phase flux at the respective perforated grid block is first encountered to be at a value below a pre-defined ratio limit when traversing the respective pathway from the respective perforated grid block on the respective drainage plane, and a location of one of the plurality of grid blocks along the respective pathway from the respective perforated grid block on the respective drainage plane where a distance of the respective one of the plurality of grid blocks from the respective perforated grid block is first encountered to have a value that meets or exceeds a pre-defined distance limit when traversing the respective pathway from the respective perforated grid block on the respective drainage plane, and storing the determined drainage boundary in the second database; and static well pressure program product to determine static well pressure for each of the one or more wells, the static well pressure program product stored in the memory of the reservoir simulator computer and comprising instructions that when executed by the reservoir simulator computer cause the reservoir simulator computer to perform the operations of:

determining an estimate of the effective drainage volume of each of the one or more wells responsive to the respective determined drainage boundaries of each of the one or more drainage planes associated with the respective one or more wells, storing the estimate of the effective drainage volume of each of the one or more wells in the third database, determining a dynamic grid block pressure of the each of a plurality of grid blocks contained within the respective effective drainage volume of each of the one or more wells, storing the dynamic grid block pressures in the fourth database, determining a pore volume average of the dynamic grid block pressure of at least a substantial subset of the plurality of grid blocks contained within each respective effective drainage volume of each respective well to thereby define an estimated static well pressure for each of the one or more wells, and storing the estimated static well pressure for each separate one of the one or more wells in the fifth database.

2. A system as defined in claim 1, wherein the operation of determining a location of each separate drainage boundary along each corresponding separate one of the plurality of pathways extending from the respective perforated grid block on the respective drainage plane for each of the one or more well segments for each of the one or more wells to thereby estimate the effective drainage volume of each of the one or more wells, includes:

approximating one or more of the determined drainage boundaries using continuous straight lines.

3. A system as defined in claim 1, wherein the static well pressure program product further includes instructions that when executed by the reservoir simulator computer cause the reservoir simulator computer to perform the operation of:

simplifying a shape of the effective drainage volume of each of the one or more wells at each time step of the reservoir simulator to a shape of a rectangular three-dimensional approximate drainage volume box comprising a plurality of layers, at least one of the layers having a different thickness than at least one other of the layers.

4. A system as defined in claim 1, wherein a model of the one or more wells utilized by the static well pressure program product comprises a plurality of drainage planes, and wherein the effective drainage volume of the one or more wells is estimated based on the determined drainage boundaries of two perpendicular drainage planes of the plurality of drainage planes to thereby reduce computational requirements.

5. A system as defined in claim 1, wherein a model of the reservoir utilized by the drainage boundary program product is divided among a plurality of processors for performing the operation of determining a location of each separate drainage boundary of each respective drainage plane for the one or more wells;

wherein a model of one of the one or more wells utilized by the static well pressure program product includes a multi-domain drainage plane having a drainage boundary that extends beyond a domain boundary of a first processor of the plurality of processors containing the respective well; and wherein the drainage boundary program product further includes instructions that when executed by the reservoir simulator computer, cause the computer to perform the following operations when an outer limit of the domain boundary of the first processor is reached when traversing the multi-domain drainage plane along the one of the plurality of pathways extending from the perforated grid block of the multi-domain drainage plane:

storing distance data for the traversed grid block located along the one of the plurality of pathways at the outer limit of the domain boundary of the first processor, storing direction data indicating a direction of traversed along the one of the plurality of pathways in which the respective outer limit of the domain boundary of the first processor is reached, and synchronizing the distance and direction data with a second one of the plurality of processors having a domain boundary adjacent the outer limit of the domain boundary of the first processor.

6. A system as defined in claim 1, wherein a model of the reservoir utilized by the drainage boundary program product is divided among a plurality of processors for performing the operation of determining a location of each separate drainage boundary of each respective drainage plane for the one or more wells;

wherein a model of one of the one or more wells utilized by the static well pressure program product includes a multi-domain drainage plane having a drainage boundary that extends beyond a domain boundary of a first processor of the plurality of processors containing the respective well in at least one of the plurality of directions; and wherein the drainage boundary program product further includes instructions that when executed by the reservoir simulator computer, cause the computer to perform the operations of establishing for each of the plurality of directions in which the respective drainage boundary extends beyond the domain boundary of the first processor, a loop with a loop length equal to a number of the plurality of processors.

7. A system as defined in claim 1, wherein the estimated static well pressure for each of the one or more wells is an estimated average static well pressure of the respective effective drainage volume (p_static) determined according to the following calculation:

$$p\_static = [Sum(Vp(k))*P(k)] \div Sum(Vp(k)),$$

wherein:
k refers to all grid blocks in the effective drainage volume,
Vp(k) is the pore volume of grid block k within the effective drainage volume,
P(k) is the dynamic pressure of grid block k, and
Sum is the summation operator.

8. A system as defined in claim 1, wherein the operation of determining an estimate of the effective drainage volume of each of the one or more wells comprises determining an estimate of the effective drainage volume of each of the one or more wells at each of the plurality of Newton iterations in the fully implicit reservoir simulator.

9. A system as defined in claim 1, wherein the operation of determining an estimate of the effective drainage volume of each of the one or more wells is performed for a heterogeneous reservoir.

10. A system as defined in claim 1, wherein each of the plurality of directions from the respective perforated grid block on the respective drainage plane for each of one or more drainage planes of the respective one or more well segments of at least one of the one or more wells are spaced 90 degrees apart from each other.

11. Reservoir modeling program product to determine static well pressures for one or more arbitrary shaped wells in both homogeneous and heterogeneous reservoirs, the program product comprising a set of instructions, embodied on a non-transitory machine-readable storage medium, that when executed by a computer, cause the computer to perform the operations of:
for each of a plurality of grid blocks contained within an effective drainage volume of a well, computing a plurality of fluid flow flux vectors at each of a corresponding plurality of interfaces with a plurality of neighboring grid blocks;
selecting one or more drainage planes of a corresponding one or more well segments of the well, the one or more drainage planes each being oriented perpendicular to a direction of the corresponding one or more well segments of the well and including a face of a perforated grid block and a face of each of a plurality of grid blocks adjacent thereto;
performing the following on each of the plurality of grid blocks located along each separate one of a plurality of directions defining a plurality of pathways extending outward from the respective perforated grid block on the respective one of the one or more drainage planes to thereby determine each drainage boundary of the effective drainage volume of the well:
tracking a sign of each of the plurality of computed fluid flow flux vectors for each of the plurality of grid blocks located along the respective pathway extending from the respective perforated grid block on the respective drainage plane,
comparing a magnitude of a phase flux for each of the plurality of grid blocks located along the respective pathway extending from the respective perforated grid block on the respective drainage plane with a magnitude of a corresponding phase flux at the perforated grid block for the respective drainage plane, and
determining a distance of each of the plurality of grid blocks located along the respective pathway extending from the respective perforated grid block on the respective drainage plane;
determining a location of each separate drainage boundary along each corresponding separate one of the plurality of pathways extending from the respective perforated grid block on the respective drainage plane for each of the one or more well segments of the well to thereby estimate the effective drainage volume of the well, the location of each drainage boundary of each separate drainage plane of the one or more drainage planes being at a respective one of the following locations having a lesser distance from the respective associated perforated grid block than each other of the following locations:
a location of one of the plurality of grid blocks along the respective pathway from the respective perforated grid block on the respective drainage plane where a change in the sign of the associated fluid flow flux vector for the one of the plurality of grid blocks from the sign of the associated fluid flow flux vector of an adjacent prior traversed one of the plurality of grid blocks along the respective pathway is first encountered when traversing the respective pathway from the respective perforated grid block on the respective drainage plane,
a location of one of the plurality of grid blocks along the respective pathway from the respective perforated grid block on the respective drainage plane where a phase flux ratio of the magnitude of the phase flux of the respective one of the plurality of grid blocks to the magnitude of the corresponding phase flux at the respective perforated grid block is first encountered to be at a value below a pre-defined ratio limit when traversing the respective pathway from the respective perforated grid block on the respective drainage plane, and
a location of one of the plurality of grid blocks along the respective pathway from the respective perforated grid block on the respective drainage plane where a distance of the respective one of the plurality of grid blocks from the respective perforated grid block is first encountered to have a value that meets or exceeds a pre-defined distance limit when traversing the respective pathway from the respective perforated grid block on the respective drainage plane;
determining an estimate of the effective drainage volume of the well responsive to the determined drainage boundaries of at least one of the one or more drainage planes to thereby identify the grid blocks contained within the effective drainage volume;
determining a dynamic grid block pressure of each of a plurality of the grid blocks contained within the effective drainage volume of the well; and
determining a pore volume average of the dynamic grid block pressure of at least a substantial subset of the plurality of grid blocks contained within the effective drainage volume of the well to thereby define an estimated static well pressure for the well.

12. Reservoir modeling program product as defined in claim 11, wherein the operation of determining a location of each separate drainage boundary along each corresponding separate one of the plurality of pathways extending from the respective perforated grid block on the respective drainage plane for each of the one or more well segments of the well to thereby determine the effective drainage volume of the well, includes:
approximating one or more of the determined drainage boundaries using continuous straight lines.

13. Reservoir modeling program product as defined in claim 11, wherein the operations further comprise:
determining an estimate of the effective drainage volume of the well, to include the operation of:
simplifying a shape of the effective drainage volume of the well at each time step of the reservoir simulator to the shape of a rectangular three-dimensional drainage volume box comprising a plurality of layers, at least one of the layers having a different thickness than at least one other of the layers.

14. Reservoir modeling program product as defined in claim 11, wherein a model of the well comprises a plurality of drainage planes, and wherein the effective drainage volume of the well is estimated based upon the determined drainage boundaries of two perpendicular drainage planes of the plurality of drainage planes to thereby reduce computational requirements.

15. Reservoir modeling program product as defined in claim 11,
wherein a model of the reservoir is divided among a plurality of processors for performing the operation of determining a location of each separate drainage boundary of each respective drainage plane for the well;
wherein a model of the well includes a multi-domain drainage plane having a drainage boundary that extends beyond a domain boundary of a first processor of the plurality of processors containing the respective well; and
wherein the following operations are performed when an outer limit of the domain boundary of the first processor is reached when traversing the multi-domain drainage plane along the one of the plurality of pathways extending from the respective perforated grid block:
storing distance data for the traversed grid block located along the one of the plurality of pathways at the outer limit of the domain boundary of the first processor,
storing direction data indicating a direction traversed along the one of the plurality of pathways in which the respective outer limit of the domain boundary of the first processor is reached, and
synchronizing the distance and direction data with a second one of the plurality of processors having a domain boundary adjacent the outer limit of the domain boundary of the first processor.

16. Reservoir modeling program product as defined in claim 11,
wherein a model of the reservoir is divided among a plurality of processors for performing the operation of determining a location of each separate drainage boundary of each respective drainage plane for the well;
wherein a model of the well includes a multi-domain drainage plane having a drainage boundary that extends beyond a domain boundary of a first processor of the plurality of processors containing the respective well in at least one of the plurality of directions; and wherein the operations further comprise establishing for each of the plurality of directions in which the respective drainage boundary extends beyond the domain boundary of the first processor, a loop with a loop length equal to a number of the plurality of processors.

17. Reservoir modeling program product as defined in claim 11, wherein the estimated static well pressure for the well is an estimated average static well pressure of the effective drainage volume (p_static) determined according to the following calculation:

$$p\_static = [Sum(Vp(k)) * P(k)] \div Sum(Vp(k)),$$

wherein:
k refers to all grid blocks in the effective drainage volume,
$Vp(k)$ is the pore volume of grid block k within the effective drainage volume,
$P(k)$ is the dynamic pressure of grid block k, and
Sum is the summation operator.

18. Reservoir modeling program product as defined in claim 11, wherein the operation of determining an estimate of the effective drainage volume of the well comprises:
determining an estimate of the effective drainage volume of the well at each of the plurality of Newton iterations in the fully implicit reservoir simulator.

19. Reservoir modeling program product as defined in claim 11, wherein the operation of determining an estimate of the effective drainage volume is performed for a heterogeneous reservoir.

20. Reservoir modeling program product as defined in claim 11, wherein each of the plurality of directions from the respective perforated grid block on the respective drainage plane for each of one or more drainage planes of the respective one or more well segments of at least one of the one or more wells are spaced 90 degrees apart from each other.

21. Reservoir modeling program product to determine static well pressures for one or more arbitrary shaped wells in both homogeneous and heterogeneous reservoirs, the program product comprising a set of instructions, embodied on a non-transitory machine-readable storage medium, that when executed by a computer, cause the computer to perform the operations of:
determining a location of each separate drainage boundary along each corresponding separate one of a plurality of pathways extending from a perforated grid block on a drainage plane of a well segment of a well to thereby estimate an effective drainage volume of the well:
for reservoir simulations where multiple wells compete for fluid production, determining the location of the respective drainage boundary to be:
a location of one of a plurality of grid blocks along the respective pathway from the perforated grid block where a change in a sign of an associated fluid flow flux vector for the one of the plurality of grid blocks from the sign of the associated fluid flow flux vector of an adjacent prior traversed one of the plurality of grid blocks along the respective pathway is first encountered when traversing the respective pathway from the perforated grid block on the drainage plane, and
for reservoir simulations where multiple wells do not significantly compete for fluid production such that a change in fluid flow flux due to well competition is not anticipated to be first encountered, determining the location of the respective drainage boundary to be at a respective one of the following locations having a lesser distance from the perforated grid block than the other of the following locations:

a location of one of the plurality of grid blocks positioned along the respective pathway from the perforated grid block where a phase flux ratio of a magnitude of a phase flux of the respective one of the plurality of grid blocks to a magnitude of the corresponding phase flux at the perforated grid block is first encountered to be at a value below a pre-defined ratio limit when traversing the respective pathway from the perforated grid block on the drainage plane, and a location of one of the plurality of grid blocks positioned along the respective pathway from the perforated grid block where a distance of the respective one of the plurality of grid blocks from the perforated grid block is first encountered to have a value that meets or exceeds a pre-defined distance limit when traversing the respective pathway from the perforated grid block on the drainage plane;

determining a dynamic grid block pressure of each of a plurality of the grid blocks contained within the effective drainage volume of the well; and determining a pore volume average of the dynamic grid block pressure of at least a substantial subset of the plurality of grid blocks contained within the effective drainage volume of the well to thereby define an estimated static well pressure for the well.

22. Reservoir modeling program product as defined in claim 21, wherein the drainage plane is a selected drainage plane of a corresponding well segment of the well being oriented perpendicular to a direction of the well segment of the well and including a face of the perforated grid block and a face of each of the plurality of grid blocks adjacent thereto, and wherein the operations further comprise:

performing for each of the plurality of grid blocks contained within the effective drainage volume of the well and at each Newton iteration of each time step calculation of a finite difference grid centered reservoir simulator, the operation of computing a plurality of fluid flow flux vectors at each of a corresponding plurality of interfaces with a plurality of neighboring grid blocks; and performing the following on each of the plurality of grid blocks located along each separate one of a plurality of directions defining the plurality of pathways extending outward from the perforated grid block on the drainage plane to thereby determine each drainage boundary of the effective drainage volume of the well:

tracking a sign of each of the plurality of computed fluid flow flux vectors for each of the plurality of grid blocks located along the respective pathway extending from the perforated grid block on the drainage plane, comparing a magnitude of a phase flux for each of the plurality of grid blocks located along the respective pathway extending from the perforated grid block with a magnitude of a corresponding phase flux at the perforated grid block for the drainage plane, and determining a distance of each of the plurality of grid blocks located along the respective pathway extending from the perforated grid block on the drainage plane.

23. Reservoir modeling program product as defined in claim 21, wherein the operation of determining a location of each separate drainage boundary along each corresponding separate one of the plurality of pathways extending from the perforated grid block on the drainage plane includes determining the location of each separate drainage boundary along each corresponding separate one of the plurality of pathways extending from the respective perforated grid block for both reservoir simulations where multiple wells compete for fluid production and reservoir simulations where multiple wells do not compete for fluid production, to be at the one of the following locations having a lesser distance from the perforated grid block than each other of the following locations:

the location of one of a plurality of grid blocks along the respective pathway from the perforated grid block where the change in the sign of an associated fluid flow flux vector for the one of the plurality of grid blocks from the sign of the associated fluid flow flux vector of an adjacent prior traversed one of the plurality of grid blocks along the respective pathway is first encountered when traversing the respective pathway from the perforated grid block;

the location of one of the plurality of grid blocks positioned along the respective pathway from the perforated grid block where the phase flux ratio of the magnitude of a phase flux of the respective one of the plurality of grid blocks to the magnitude of the corresponding phase flux at the perforated grid block is first encountered to be at a value below the pre-defined ratio limit when traversing the respective pathway from the perforated grid block; and the location of one of the plurality of grid blocks positioned along the respective pathway from the perforated grid block where the distance of the respective one of the plurality of grid blocks from the perforated grid block is first encountered to have a value that meets or exceeds the pre-defined distance limit when traversing the respective pathway from the perforated grid block.

24. Reservoir modeling program product as defined in claim 21, wherein the operation of determining a location of each separate drainage boundary along each corresponding separate one of a plurality of pathways extending from a perforated grid block on a drainage plane of a well segment of a well to thereby estimate the effective drainage volume of the well includes:

approximating one or more of the determined drainage boundaries using continuous straight lines.

25. Reservoir modeling program product as defined in claim 21, further comprising the operation of:

determining an estimate of the effective drainage volume of the well responsive to the determined drainage boundaries of the drainage plane to thereby identify the grid blocks contained within the effective drainage volume, to include the operation of:

simplifying a shape of the drainage volume of the well at each time step of the reservoir simulator to the shape of a rectangular three-dimensional drainage volume box comprising a plurality of layers, at least one of the layers having a different thickness than at least one other of the layers.

26. Reservoir modeling program product as defined in claim 21, wherein a model of the well comprises a plurality of drainage planes, and wherein the effective drainage volume of the well is estimated based on the determined drainage boundaries of two perpendicular drainage planes of the plurality of drainage planes.

27. Reservoir modeling program product as defined in claim 21, wherein a model of the reservoir is divided among a plurality of processors for performing the operation of determining a location of each separate drainage boundary of the drainage plane of the well segment for the well;

wherein the drainage plane is a multi-domain drainage plane having a drainage boundary that extends beyond a domain boundary of a first processor of the plurality of processors containing the well; and wherein the following operations are performed when an outer limit of the domain boundary of the first processor is reached when traversing the multi-domain drainage plane along the one of the plurality of pathways extending from the respective perforated grid block:

storing distance data for the traversed grid block located along the one of the plurality of pathways at the outer limit of the domain boundary of the first processor, storing direction data indicating a direction traversed along the one of the plurality of pathways in which the respective outer limit of the domain boundary of the first processor is reached, and synchronizing the distance and direction data with a second one of the plurality of processors having a domain boundary adjacent the outer limit of the domain boundary of the first processor.

28. Reservoir modeling program product as defined in claim 21, wherein a model of the reservoir is divided among a plurality of processors for performing the operation of determining a location of each separate drainage boundary of the drainage plane for the well;

wherein the drainage plane is a multi-domain drainage plane having a drainage boundary that extends beyond a domain boundary of a first processor of the plurality of processors containing the respective well in at least one of the plurality of directions; and wherein the operations further comprise establishing for each of the plurality of directions in which the respective drainage boundary extends beyond the domain boundary of the first processor, a loop with a loop length equal to a number of the plurality of processors.

29. Reservoir modeling program product as defined in claim 21, wherein the operations further comprise:

determining an estimate of the effective drainage volume of the well responsive to the determined drainage boundaries of the drainage plane to thereby identify the grid blocks contained within the drainage volume;

wherein the operation of determining the effective drainage volume is performed for a heterogeneous reservoir through application of a numerical solution; and wherein the estimated static well pressure for the well is an estimated average static well pressure of the effective drainage volume (p_static) determined according to the following calculation:

p_static=[Sum(Vp(k))*P(k)]÷Sum(Vp(k)), wherein:

k refers to all grid blocks in the effective drainage volume,

Vp(k) is the pore volume of grid block k within the effective drainage volume,

P(k) is the dynamic pressure of grid block k, and

Sum is the summation operator.

30. Reservoir modeling program product as defined in claim 21, further comprising the operation of determining an estimate of the effective drainage volume of the well responsive to the determined drainage boundaries of the drainage plane to thereby identify the grid blocks contained within the effective drainage volume, to include the operation of:

determining an estimate of the effective drainage volume of the well at each of a plurality of Newton iterations in the fully implicit reservoir simulator.

31. Reservoir modeling program product to determine static well pressures for one or more arbitrary shaped wells in both homogeneous and heterogeneous reservoirs, the program product comprising a set of instructions, embodied on a non-transitory machine-readable storage medium, that when executed by a computer, cause the computer to perform the operations of:

determining a plurality of drainage boundaries of a drainage plane for a well segment of a well to thereby identify grid blocks contained within an effective drainage volume of the well;

determining a grid block pressure of the each of a plurality of grid blocks contained within the effective drainage volume of the well; and estimating static well pressure for the well responsive to determining a pore volume average of the grid block pressure of each of a plurality of grid blocks within the effective drainage volume of the well.

32. Reservoir modeling program product as defined in claim 31, wherein the operations further comprise:

determining an estimate of the effective drainage volume of the well responsive to the determined drainage boundaries of at least one of one or more drainage planes for the well to thereby identify the grid blocks contained within the effective drainage volume; and identifying each of the plurality of grid blocks contained within the drainage volume of the well; and wherein the operation of determining a pore volume average of the grid block pressure of each of a plurality of grid blocks within the drainage volume of the well includes determining the pore volume average of the grid block pressure of at least approximately 95% of the grid blocks contained within the drainage volume of the well.

33. Reservoir modeling program product as defined in claim 31, wherein the well segment is contained within a perforated grid block;

wherein the operation of determining a plurality of drainage boundaries of a drainage plane, includes:

determining a location of each separate drainage boundary along each corresponding separate one of a plurality of pathways extending from the perforated grid block associated with the drainage plane.

34. Reservoir modeling program product as defined in claim 33, wherein for reservoir simulations where multiple wells compete for fluid production, the operation of determining a location of each separate drainage boundary along each corresponding separate one of a plurality of pathways, includes:

determining the location of the respective drainage boundary to be a location of one of a plurality of grid blocks along the respective pathway from the perforated grid block where a change in a sign of an associated fluid flow flux vector for the one of the plurality of grid blocks from the sign of the associated fluid flow flux vector of an adjacent prior traversed one of the plurality of grid blocks along the respective pathway is first encountered when traversing the respective pathway from the perforated grid block on the drainage plane.

35. Reservoir modeling program product as defined in claim 33, wherein for reservoir simulations where multiple wells do not significantly compete for fluid production such that a change in fluid flow flux due to well competition is not anticipated to be first encountered, the operation of determining a location of each separate drainage boundary along each corresponding separate one of a plurality of pathways, includes:
determining the location of the respective drainage boundary to be at a respective one of the following locations having a lesser distance from the perforated grid block than the other of the following locations:
a location of one of the plurality of grid blocks positioned along the respective pathway from the perforated grid block where a phase flux ratio of a magnitude of a phase flux of the respective one of the plurality of grid blocks to a magnitude of the corresponding phase flux at the perforated grid block is first encountered to be at a value below a pre-defined ratio limit when traversing the respective pathway from the perforated grid block on the drainage plane, and
a location of one of the plurality of grid blocks positioned along the respective pathway from the perforated grid block where a distance of the respective one of the plurality of grid blocks from the perforated grid block is first encountered to have a value that meets or exceeds a pre-defined distance limit when traversing the respective pathway from the perforated grid block on the drainage plane.

36. Reservoir modeling program product as defined in claim 33, wherein the operation of determining a location of each separate drainage boundary along each corresponding separate one of the plurality of pathways extending from the perforated grid block on the drainage plane, includes:
determining the location of each separate drainage boundary along each corresponding separate one of the plurality of pathways extending from the respective perforated grid block for both reservoir simulations where multiple wells compete for fluid production and reservoir simulations where multiple wells do not compete for fluid production, to be at the one of the following locations having a lesser distance from the perforated grid block than each other of the following locations:
the location of one of a plurality of grid blocks along the respective pathway from the perforated grid block where the change in the sign of an associated fluid flow flux vector for the one of the plurality of grid blocks from the sign of the associated fluid flow flux vector of an adjacent prior traversed one of the plurality of grid blocks along the respective pathway is first encountered when traversing the respective pathway from the perforated grid block,
the location of one of the plurality of grid blocks positioned along the respective pathway from the perforated grid block where the phase flux ratio of the magnitude of a phase flux of the respective one of the plurality of grid blocks to the magnitude of the corresponding phase flux at the perforated grid block is first encountered to be at a value below the pre-defined ratio limit when traversing the respective pathway from the perforated grid block, and
the location of one of the plurality of grid blocks positioned along the respective pathway from the perforated grid block where the distance of the respective one of the plurality of grid blocks from the perforated grid block is first encountered to have a value that meets or exceeds the pre-defined distance limit when traversing the respective pathway from the perforated grid block.

37. Reservoir modeling program product as defined in claim 31, wherein the operations further comprise:
performing for each of the plurality of grid blocks contained within the effective drainage volume of the well and at each Newton iteration of each time step calculation of a finite difference grid centered reservoir simulator, the operation of computing a plurality of fluid flow flux vectors at each of a corresponding plurality of interfaces with a plurality of neighboring grid blocks; and
performing the following on each of the plurality of grid blocks located along each separate one of a plurality of directions defining the plurality of pathways extending outward from a perforated grid block on the drainage plane to thereby determine each drainage boundary of the effective drainage volume of the well:
tracking a sign of each of the plurality of computed fluid flow flux vectors for each of the plurality of grid blocks located along the respective pathway extending from the perforated grid block on the drainage plane,
comparing a magnitude of a phase flux for each of the plurality of grid blocks located along the respective pathway extending from the perforated grid block with a magnitude of a corresponding phase flux at the perforated grid block for the drainage plane, and
determining a distance of each of the plurality of grid blocks located along the respective pathway extending from the perforated grid block on the drainage plane.

38. Reservoir modeling program product as defined in claim 31,
wherein a model of the well comprises a plurality of drainage planes;
wherein the operation of determining a plurality of drainage boundaries of a drainage plane for a well segment is performed for each of the plurality of drainage planes; and
wherein the effective drainage volume of the well is estimated based on the determined drainage boundaries of two perpendicular drainage planes of the plurality of drainage planes.

39. Reservoir modeling program product as defined in claim 31,
wherein a model of the reservoir is divided among a plurality of processors for performing the operation of determining a location of each separate drainage boundary of the drainage plane of the well segment for the well;
wherein the drainage plane is a multi-domain drainage plane having a drainage boundary that extends beyond a domain boundary of a first processor of the plurality of processors containing the well; and
wherein the following operations are performed when an outer limit of the domain boundary of the first processor is reached when traversing the multi-domain drainage plane along the one of the plurality of pathways extending from the respective perforated grid block:
storing distance data for the traversed grid block located along the one of the plurality of pathways at the outer limit of the domain boundary of the first processor,
storing direction data indicating a direction traversed along the one of the plurality of pathways in which the respective outer limit of the domain boundary of the first processor is reached, and
synchronizing the distance and direction data with a second one of the plurality of processors having a domain boundary adjacent the outer limit of the domain boundary of the first processor.

40. Reservoir modeling program product as defined in claim 31, wherein the operations further comprise:

determining an estimate of the effective drainage volume of the well responsive to the determined drainage boundaries of at least one of one or more drainage planes for the well to thereby identify the grid blocks contained within the effective drainage volume;

wherein the operation of determining an estimate of the effective drainage volume is performed for a heterogeneous reservoir through application of a numerical solution.

41. A computer implemented method to determine a plurality of approximate static well pressures for one or more arbitrary shaped wells in a reservoir, the computer implemented method comprising the steps of:

performing for each of a plurality of grid blocks contained within an effective drainage volume of a well and at each Newton iteration of each time step calculation of a finite difference grid centered reservoir simulator, the step of computing a plurality of fluid flow flux vectors at each of a corresponding plurality of interfaces with a plurality of neighboring grid blocks;

selecting one or more drainage planes of a corresponding one or more well segments for the well, each drainage plane including a perforated grid block and being perpendicular to the well segment of the respective well;

determining a location of each separate drainage boundary along each corresponding separate one of the plurality of pathways extending from the respective perforated grid block on each of the one or more drainage planes to thereby estimate the effective drainage volume of each of the well:

for reservoir simulations where multiple wells compete for fluid production, determining the location of the respective drainage boundary to be:

a location of one of a plurality of grid blocks along the respective pathway from the respective perforated grid block on the respective drainage plane where a change in a sign of an associated fluid flow flux vector for the one of the plurality of grid blocks from the sign of the associated fluid flow flux vector of an adjacent prior traversed one of the plurality of grid blocks along the respective pathway is first encountered when traversing the respective pathway from the respective perforated grid block on the respective drainage plane, and for reservoir simulations where multiple wells do not significantly compete for fluid production, determining the location of the respective drainage boundary to be at a respective one of the following locations having a lesser distance from the respective perforated grid block than the other of the following locations:

a location of one of the plurality of grid blocks positioned along the respective pathway from the respective perforated grid block on the respective drainage plane where a phase flux ratio of a magnitude of a phase flux of the respective one of the plurality of grid blocks to a magnitude of the corresponding phase flux at the respective perforated grid block is first encountered to be at a value below a pre-defined ratio limit when traversing the respective pathway from the respective perforated grid block on the respective drainage plane, and a location of one of the plurality of grid blocks positioned along the respective pathway from the respective perforated grid block on the respective drainage plane where a distance of the respective one of the plurality of grid blocks from the respective perforated grid block is first encountered to have a value that meets or exceeds a pre-defined distance limit when traversing the respective pathway from the respective perforated grid block on the respective drainage plane;

determining an estimate of the effective drainage volume of the well responsive to the determined drainage boundaries of each of the one or more drainage planes to thereby identity the grid blocks contained within the effective drainage volume;

determining a grid block pressure of each of a plurality of grid blocks contained within the effective drainage volume of the well; and determining a pore volume average of the dynamic grid block pressure of at least a substantial subset of the plurality of grid blocks contained within the effective drainage volume of the well to thereby define an estimated static well pressure for the well.

42. A computer implemented method as defined in claim 41, further comprising the steps of performing the following on each of the plurality of grid blocks located along each separate one of the plurality of pathways extending outward from the respective perforated grid block on the respective drainage plane to thereby determine each drainage boundary of the effective drainage volume of the well:

tracking a sign of each of the plurality of computed fluid flow flux vectors for each of the plurality of grid blocks located along the respective pathway extending from the perforated grid block on the respective drainage plane;

comparing a magnitude of a phase flux for each of the plurality of grid blocks located along the respective pathway extending from the perforated grid block on the respective drainage plane with a magnitude of a corresponding phase flux at the perforated grid block for the drainage plane; and determining a distance of each of the plurality of grid blocks located along the respective pathway extending from the perforated grid block on the respective drainage plane.

43. A computer implemented method as defined in claim 41, wherein the step of determining a location of each separate drainage boundary along each corresponding separate one of the plurality of pathways extending from the respective perforated grid block on each of the one or more drainage planes includes determining the location of each separate drainage boundary along each corresponding separate one of the plurality of pathways extending from the respective perforated grid block on each of the one or more drainage planes for both reservoir simulations where multiple wells compete for fluid production and reservoir simulations where multiple wells do not compete for fluid production, to be at the one of the following locations having a lesser distance from the respective associated perforated grid block on the respective drainage plane than each other of the following locations:

the location of one of a plurality of grid blocks along the respective pathway from the respective perforated grid block on the respective drainage plane where the change in the sign of an associated fluid flow flux vector for the one of the plurality of grid blocks from the sign of the associated fluid flow flux vector of an adjacent prior traversed one of the plurality of grid blocks along the respective pathway is first encountered when traversing the respective pathway from the respective perforated grid block on the respective drainage plane;

the location of one of the plurality of grid blocks positioned along the respective pathway from the respective perforated grid block on the respective drainage plane where the phase flux ratio of the magnitude of a phase flux of the respective one of the plurality of grid blocks to the magnitude of the corresponding phase flux at the respective perforated grid block is first encountered to be at a value below the pre-defined ratio limit when traversing the respective pathway from the respective perforated grid block on the respective drainage plane; and the location of one of the plurality of grid blocks positioned along the respective pathway from the respective perforated grid block on the respective drainage plane where the distance of the respective one of the plurality of grid blocks from the respective perforated grid block is first encountered to have a value that meets or exceeds the pre-defined distance limit when traversing the respective pathway from the respective perforated grid block on the respective drainage plane.

44. A computer implemented method as defined in claim 41, wherein the step of determining a location of each separate drainage boundary along each corresponding separate one of the plurality of pathways extending from the respective perforated grid block on each of the one or more drainage planes to thereby estimate the effective drainage volume of the well, includes:

approximating the one or more determined drainage boundaries using continuous straight lines.

45. A computer implemented method as defined in claim 41, wherein the step of determining an estimate of the effective drainage volume of the well responsive to the determined drainage boundaries of the one or more drainage planes to thereby identify the grid blocks contained within the effective drainage volume, comprises the step of:

simplifying a shape of the effective drainage volume of the well at each time step of the fully implicit reservoir simulator to the shape of a rectangular three-dimensional drainage volume box comprising a plurality of layers, at least one of the layers having a different thickness than at least one other of the layers.

46. A computer implemented method as defined in claim 41, wherein a model of the well comprises a plurality of drainage planes, and wherein the effective drainage volume of the well is estimated based on the determined drainage boundaries of two perpendicular drainage planes of the plurality of drainage planes to thereby reduce computational requirements.

47. A computer implemented method as defined in claim 41, wherein a model of the reservoir is divided among a plurality of processors for performing the step of determining a location of each separate drainage boundary of the respective drainage plane of the well segment for the well;

wherein at least one drainage plane of the one or more drainage planes is a multi-domain drainage plane having a drainage boundary that extends beyond a domain boundary of a first processor of the plurality of processors containing the well; and wherein the following steps are performed when an outer limit of the domain boundary of the first processor is encountered when traversing the multi-domain drainage plane along the one of the plurality of pathways extending from the respective perforated grid block:

storing distance data for the traversed grid block located along the one of the plurality of pathways at the outer limit of the domain boundary of the first processor, storing direction data indicating a direction traversed along the one of the plurality of pathways in which the respective outer limit of the domain boundary of the first processor is reached, and synchronizing the distance and direction data with a second one of the plurality of processors having a domain boundary adjacent the outer limit of the domain boundary of the first processor.

48. A computer implemented method as defined in claim 41, wherein a model of the reservoir is divided among a plurality of processors for performing the step of determining a location of each separate drainage boundary of the respective drainage plane for the well;

wherein at least one drainage plane of the one or more drainage planes is a multi-domain drainage plane having a drainage boundary that extends beyond a domain boundary of a first processor of the plurality of processors containing the respective well in at least one of the plurality of directions; and wherein the method further comprises the step of establishing for each of the plurality of directions in which the respective drainage boundary extends beyond the domain boundary of the first processor, a loop with a loop length equal to a number of the plurality of processors.

49. A computer implemented method as defined in claim 41, further comprising the step of:

determining an estimate of the effective drainage volume of the well responsive to the determined drainage boundaries of each of the one or more drainage planes to thereby identify the grid blocks contained within the effective drainage volume;

wherein the step of estimating the effective drainage volume is performed for a heterogeneous reservoir through application of a numerical solution; and wherein the estimated static well pressure for the well is an estimated average static well pressure of the effective drainage volume (p_static) determined according to the following calculation:

$$p\_static=[\text{Sum}(Vp(k))*P(k)] \div \text{Sum}(Vp(k)),$$

wherein:
k refers to all grid blocks in the effective drainage volume,
$Vp(k)$ is the pore volume of grid block k within the effective drainage volume,
$P(k)$ is the dynamic pressure of grid block k, and
Sum is the summation operator.

50. A computer implemented method as defined in claim 41, wherein the step of determining an estimate of the effective drainage volume of the well responsive to the determined drainage boundaries of each of the one or more drainage planes to thereby identify the grid blocks contained within the drainage volume, comprises the step of:

determining an estimate of the effective drainage volume of the well at each of a plurality of Newton iterations in the fully implicit reservoir simulator.

51. A computer implemented method to determine a plurality of approximate static well pressures for one or more arbitrary shaped wells in a reservoir, the computer implemented method comprising the steps of:

determining a location of each separate drainage boundary along each corresponding separate one of a plurality of pathways extending from a perforated grid block on a drainage plane of a well segment of a well to thereby estimate an effective drainage volume of the well:

for reservoir simulations where multiple wells compete for fluid production, determining the location of the respective drainage boundary to be:
  a location of one of a plurality of grid blocks along the respective pathway from the perforated grid block where a change in a sign of an associated fluid flow flux vector for the one of the plurality of grid blocks from the sign of the associated fluid flow flux vector of an adjacent prior traversed one of the plurality of grid blocks along the respective pathway is first encountered when traversing the respective pathway from the perforated grid block on the drainage plane, and
for reservoir simulations where multiple wells do not significantly compete for fluid production such that a change in fluid flow flux due to well competition is not anticipated to be first encountered, determining the location of the respective drainage boundary to be at a respective one of the following locations having a lesser distance from the perforated grid block than the other of the following locations:
  a location of one of the plurality of grid blocks positioned along the respective pathway from the perforated grid block where a phase flux ratio of a magnitude of a phase flux of the respective one of the plurality of grid blocks to a magnitude of the corresponding phase flux at the perforated grid block is first encountered to be at a value below a pre-defined ratio limit when traversing the respective pathway from the perforated grid block on the drainage plane, and
  a location of one of the plurality of grid blocks positioned along the respective pathway from the perforated grid block where a distance of the respective one of the plurality of grid blocks from the perforated grid block is first encountered to have a value that meets or exceeds a pre-defined distance limit when traversing the respective pathway from the perforated grid block on the drainage plane;
determining a dynamic grid block pressure of each of a plurality of the grid blocks contained within the effective drainage volume of the well; and
determining a pore volume average of the dynamic grid block pressure of at least a substantial subset of the plurality of grid blocks contained within the effective drainage volume of the well to thereby define an estimated static well pressure for the well.

52. A computer implemented method as defined in claim 51, wherein the drainage plane is a selected drainage plane of a corresponding well segment of the well being oriented perpendicular to a direction of the well segment of the well and including a face of the perforated grid block and a face of each of the plurality of grid blocks adjacent thereto, and wherein the method further comprises the steps of:
  performing for each of the plurality of grid blocks contained within the effective drainage volume of the well and at each Newton iteration of each time step calculation of a finite difference grid centered reservoir simulator, the step of computing a plurality of fluid flow flux vectors at each of a corresponding plurality of interfaces with a plurality of neighboring grid blocks; and
  performing the following on each of the plurality of grid blocks located along each separate one of a plurality of directions defining the plurality of pathways extending outward from the perforated grid block on the drainage plane to thereby determine each drainage boundary of the effective drainage volume of the well:
    tracking a sign of each of the plurality of computed fluid flow flux vectors for each of the plurality of grid blocks located along the respective pathway extending from the perforated grid block on the drainage plane,
    comparing a magnitude of a phase flux for each of the plurality of grid blocks located along the respective pathway extending from the perforated grid block with a magnitude of a corresponding phase flux at the perforated grid block for the drainage plane, and
    determining a distance of each of the plurality of grid blocks located along the respective pathway extending from the perforated grid block on the drainage plane.

53. A computer implemented method as defined in claim 51, wherein the step of determining a location of each separate drainage boundary along each corresponding separate one of the plurality of pathways extending from the perforated grid block on the drainage plane includes determining the location of each separate drainage boundary along each corresponding separate one of the plurality of pathways extending from the respective perforated grid block for both reservoir simulations where multiple wells compete for fluid production and reservoir simulations where multiple wells do not compete for fluid production, to be at the one of the following locations having a lesser distance from the perforated grid block than each other of the following locations:
  the location of one of a plurality of grid blocks along the respective pathway from the perforated grid block where the change in the sign of an associated fluid flow flux vector for the one of the plurality of grid blocks from the sign of the associated fluid flow flux vector of an adjacent prior traversed one of the plurality of grid blocks along the respective pathway is first encountered when traversing the respective pathway from the perforated grid block;
  the location of one of the plurality of grid blocks positioned along the respective pathway from the perforated grid block where the phase flux ratio of the magnitude of a phase flux of the respective one of the plurality of grid blocks to the magnitude of the corresponding phase flux at the perforated grid block is first encountered to be at a value below the pre-defined ratio limit when traversing the respective pathway from the perforated grid block; and
  the location of one of the plurality of grid blocks positioned along the respective pathway from the perforated grid block where the distance of the respective one of the plurality of grid blocks from the perforated grid block is first encountered to have a value that meets or exceeds the pre-defined distance limit when traversing the respective pathway from the perforated grid block.

54. A computer implemented method as defined in claim 51, wherein the step of determining each drainage boundary of the effective drainage volume of the well includes:
  approximating one or more of the determined drainage boundaries using continuous straight lines.

55. A computer implemented method as defined in claim 51, further comprising the step of:
  determining an estimate of the effective drainage volume of the well responsive to the determined drainage boundaries of the drainage plane to thereby identify the grid blocks contained within the effective drainage volume, to include the step of:
  simplifying a shape of the drainage volume of the well at each time step of the reservoir simulator to the shape of a rectangular three-dimensional drainage volume box comprising a plurality of layers, at least one of the layers having a different thickness than at least one other of the layers.

56. A computer implemented method as defined in claim 51, wherein a model of the well comprises a plurality of drainage planes, and wherein the effective drainage volume of the well is estimated based on the determined drainage boundaries of two perpendicular drainage planes of the plurality of drainage planes.

57. A computer implemented method as defined in claim 51,
wherein a model of the reservoir is divided among a plurality of processors for performing the step of determining a location of each separate drainage boundary of the drainage plane of the well segment for the well;
wherein the drainage plane is a multi-domain drainage plane having a drainage boundary that extends beyond a domain boundary of a first processor of the plurality of processors containing the well; and
wherein the following steps are performed when an outer limit of the domain boundary of the first processor is reached when traversing the multi-domain drainage plane along the one of the plurality of pathways extending from the respective perforated grid block:
storing distance data for the traversed grid block located along the one of the plurality of pathways at the outer limit of the domain boundary of the first processor,
storing direction data indicating a direction traversed along the one of the plurality of pathways in which the respective outer limit of the domain boundary of the first processor is reached, and
synchronizing the distance and direction data with a second one of the plurality of processors having a domain boundary adjacent the outer limit of the domain boundary of the first processor.

58. A computer implemented method as defined in claim 51,
wherein a model of the reservoir is divided among a plurality of processors for performing the step of determining a location of each separate drainage boundary of the drainage plane for the well;
wherein the drainage plane is a multi-domain drainage plane having a drainage boundary that extends beyond a domain boundary of a first processor of the plurality of processors containing the respective well in at least one of the plurality of directions; and
wherein the method further comprises the step of establishing for each of the plurality of directions in which the respective drainage boundary extends beyond the domain boundary of the first processor, a loop with a loop length equal to a number of the plurality of processors.

59. A computer implemented method as defined in claim 51, wherein the method further comprises the step of:
determining an estimate of the effective drainage volume of the well responsive to the determined drainage boundaries of the drainage plane to thereby identify the grid blocks contained within the drainage volume;
wherein the step of determining the effective drainage volume is performed for a heterogeneous reservoir through application of a numerical solution; and
wherein the estimated static well pressure for the well is an estimated average static well pressure of the effective drainage volume (p_static) determined according to the following calculation:

$$p\_static=[Sum(Vp(k))*P(k)] \div Sum(Vp(k)),$$

wherein:
k refers to all grid blocks in the effective drainage volume,
Vp(k) is the pore volume of grid block k within the effective drainage volume,
P(k) is the dynamic pressure of grid block k, and
Sum is the summation operator.

60. A computer implemented method as defined in claim 51, further comprising the step of:
determining an estimate of the effective drainage volume of the well responsive to the determined drainage boundaries of the drainage plane to thereby identify the grid blocks contained within the effective drainage volume, to include the step of:
determining an estimate of the effective drainage volume of the well at each of a plurality of Newton iterations in the fully implicit reservoir simulator.

61. A method to determine static well pressures for one or more arbitrary shaped wells in both homogeneous and heterogeneous reservoirs, the method comprising the steps of:
determining a plurality of drainage boundaries of a drainage plane for a well segment of a well to thereby identify grid blocks contained within an effective drainage volume of the well;
determining a grid block pressure of the each of a plurality of grid blocks contained within the effective drainage volume of the well; and
estimating static well pressure for the well responsive to determining a pore volume average of the grid block pressure of each of a plurality of grid blocks within the effective drainage volume of the well.

62. A method as defined in claim 61, further comprising the steps of:
determining an estimate of the effective drainage volume of the well responsive to the determined drainage boundaries of at least one of one or more drainage planes for the well to thereby identify the grid blocks contained within the effective drainage volume; and
identifying each of the plurality of grid blocks contained within the drainage volume of the well; and
wherein the step of determining a pore volume average of the grid block pressure of each of a plurality of grid blocks within the drainage volume of the well includes determining the pore volume average of the grid block pressure of at least approximately 95% of the grid blocks contained within the drainage volume of the well.

63. A method as defined in claim 61,
wherein the well segment is contained within a perforated grid block;
wherein the step of determining a plurality of drainage boundaries of a drainage plane, includes:
determining a location of each separate drainage boundary along each corresponding separate one of a plurality of pathways extending from the perforated grid block associated with the drainage plane.

64. A method as defined in claim 63, wherein for reservoir simulations where multiple wells compete for fluid production, the step of determining a location of each separate drainage boundary along each corresponding separate one of a plurality of pathways, includes:
determining the location of the respective drainage boundary to be a location of one of a plurality of grid blocks along the respective pathway from the perforated grid block where a change in a sign of an associated fluid flow flux vector for the one of the plurality of grid blocks from the sign of the associated fluid flow flux vector of an adjacent prior traversed one of the plurality of grid blocks along the respective pathway is first encountered when traversing the respective pathway from the perforated grid block on the drainage plane.

65. A method as defined in claim 63, wherein for reservoir simulations where multiple wells do not significantly compete for fluid production such that a change in fluid flow flux due to well competition is not anticipated to be first encountered, the step of determining a location of each separate drainage boundary along each corresponding separate one of a plurality of pathways, includes:
  determining the location of the respective drainage boundary to be at a respective one of the following locations having a lesser distance from the perforated grid block than the other of the following locations:
    a location of one of the plurality of grid blocks positioned along the respective pathway from the perforated grid block where a phase flux ratio of a magnitude of a phase flux of the respective one of the plurality of grid blocks to a magnitude of the corresponding phase flux at the perforated grid block is first encountered to be at a value below a pre-defined ratio limit when traversing the respective pathway from the perforated grid block on the drainage plane, and
    a location of one of the plurality of grid blocks positioned along the respective pathway from the perforated grid block where a distance of the respective one of the plurality of grid blocks from the perforated grid block is first encountered to have a value that meets or exceeds a pre-defined distance limit when traversing the respective pathway from the perforated grid block on the drainage plane.

66. A method as defined in claim 63, wherein the step of determining a location of each separate drainage boundary along each corresponding separate one of the plurality of pathways extending from the perforated grid block on the drainage plane, includes:
  determining the location of each separate drainage boundary along each corresponding separate one of the plurality of pathways extending from the respective perforated grid block for both reservoir simulations where multiple wells compete for fluid production and reservoir simulations where multiple wells do not compete for fluid production, to be at the one of the following locations having a lesser distance from the perforated grid block than each other of the following locations:
    the location of one of a plurality of grid blocks along the respective pathway from the perforated grid block where the change in the sign of an associated fluid flow flux vector for the one of the plurality of grid blocks from the sign of the associated fluid flow flux vector of an adjacent prior traversed one of the plurality of grid blocks along the respective pathway is first encountered when traversing the respective pathway from the perforated grid block,
    the location of one of the plurality of grid blocks positioned along the respective pathway from the perforated grid block where the phase flux ratio of the magnitude of a phase flux of the respective one of the plurality of grid blocks to the magnitude of the corresponding phase flux at the perforated grid block is first encountered to be at a value below the pre-defined ratio limit when traversing the respective pathway from the perforated grid block, and
    the location of one of the plurality of grid blocks positioned along the respective pathway from the perforated grid block where the distance of the respective one of the plurality of grid blocks from the perforated grid block is first encountered to have a value that meets or exceeds the pre-defined distance limit when traversing the respective pathway from the perforated grid block.

67. A method as defined in claim 61, further comprising the steps of:
  performing for each of the plurality of grid blocks contained within the effective drainage volume of the well and at each Newton iteration of each time step calculation of a finite difference grid centered reservoir simulator, the step of computing a plurality of fluid flow flux vectors at each of a corresponding plurality of interfaces with a plurality of neighboring grid blocks; and
  performing the following on each of the plurality of grid blocks located along each separate one of a plurality of directions defining the plurality of pathways extending outward from a perforated grid block on the drainage plane to thereby determine each drainage boundary of the effective drainage volume of the well:
    tracking a sign of each of the plurality of computed fluid flow flux vectors for each of the plurality of grid blocks located along the respective pathway extending from the perforated grid block on the drainage plane,
    comparing a magnitude of a phase flux for each of the plurality of grid blocks located along the respective pathway extending from the perforated grid block with a magnitude of a corresponding phase flux at the perforated grid block for the drainage plane, and
    determining a distance of each of the plurality of grid blocks located along the respective pathway extending from the perforated grid block on the drainage plane.

68. A method as defined in claim 61,
  wherein a model of the well comprises a plurality of drainage planes;
  wherein the step of determining a plurality of drainage boundaries of a drainage plane for a well segment is performed for each of the plurality of drainage planes; and
  wherein the effective drainage volume of the well is estimated based on the determined drainage boundaries of two perpendicular drainage planes of the plurality of drainage planes.

69. A method as defined in claim 61,
  wherein a model of the reservoir is divided among a plurality of processors for performing the step of determining a location of each separate drainage boundary of the drainage plane of the well segment for the well;
  wherein the drainage plane is a multi-domain drainage plane having a drainage boundary that extends beyond a domain boundary of a first processor of the plurality of processors containing the well; and
  wherein the following steps are performed when an outer limit of the domain boundary of the first processor is reached when traversing the multi-domain drainage plane along the one of the plurality of pathways extending from the respective perforated grid block:
    storing distance data for the traversed grid block located along the one of the plurality of pathways at the outer limit of the domain boundary of the first processor,
    storing direction data indicating a direction traversed along the one of the plurality of pathways in which the respective outer limit of the domain boundary of the first processor is reached, and
    synchronizing the distance and direction data with a second one of the plurality of processors having a domain boundary adjacent the outer limit of the domain boundary of the first processor.

70. A method as defined in claim 61, further comprising the step of:

determining an estimate of the effective drainage volume of the well responsive to the determined drainage boundaries of at least one of one or more drainage planes for the well to thereby identify the grid blocks contained within the effective drainage volume;

wherein the step of determining an estimate of the effective drainage volume is performed for a heterogeneous reservoir through application of a numerical solution.

* * * * *

UNITED STATES PATENT AND TRADEMARK OFFICE
CERTIFICATE OF CORRECTION

PATENT NO. : 8,589,135 B2
APPLICATION NO. : 12/774820
DATED : November 19, 2013
INVENTOR(S) : Usuf Middya and Haydar Dogru It is certified that error appears in the above-identified patent and that said Letters Patent is hereby corrected as shown below:

In the Claims

Column 40, line 10, Claim 41, the language "thereby identity the grid block contained within the" should read --thereby identify the grid block contained within the--.

Signed and Sealed this
Eighteenth Day of February, 2014

Michelle K. Lee
*Deputy Director of the United States Patent and Trademark Office*